United States Patent
McWaid et al.

(10) Patent No.: US 12,362,432 B2
(45) Date of Patent: Jul. 15, 2025

(54) PROTECTIVE INSERT FOR ELECTROCHEMICAL CELL

(71) Applicant: Verdagy, Inc., Moss Landing, CA (US)

(72) Inventors: Thomas H. McWaid, Santa Cruz, CA (US); Shizhao Su, Marina, CA (US); James R. Penny, Santa Cruz, CA (US)

(73) Assignee: Verdagy, Inc., Moss Landing, CA (US)

( * ) Notice: Subject to any disclaimer, the term of this patent is extended or adjusted under 35 U.S.C. 154(b) by 0 days.

(21) Appl. No.: 18/498,707

(22) Filed: Oct. 31, 2023

(65) Prior Publication Data

US 2024/0145870 A1    May 2, 2024

Related U.S. Application Data

(60) Provisional application No. 63/381,682, filed on Oct. 31, 2022.

(51) Int. Cl.
*H01M 50/46* (2021.01)

(52) U.S. Cl.
CPC .................... *H01M 50/46* (2021.01)

(58) Field of Classification Search
CPC ................ C25B 9/19; C25B 9/23; C25B 9/63
See application file for complete search history.

(56) References Cited

U.S. PATENT DOCUMENTS

| | | |
|---|---|---|
| 4,222,831 A | 9/1980 | Specht et al. |
| 5,693,202 A | 12/1997 | Gestermann et al. |
| 11,390,956 B1 | 7/2022 | Mcwaid et al. |
| 11,431,012 B1 | 8/2022 | Gilliam et al. |
| 11,444,304 B1 | 9/2022 | Mcwaid et al. |
| 2017/0130344 A1* | 5/2017 | Mitsushima .......... C25B 11/093 |
| 2022/0316079 A1* | 10/2022 | Manabe .................. C25B 13/02 |
| 2023/0243046 A1 | 8/2023 | Mcwaid et al. |
| 2023/0243047 A1 | 8/2023 | Mcwaid et al. |
| 2023/0250544 A1 | 8/2023 | Mcwaid et al. |

FOREIGN PATENT DOCUMENTS

| | | |
|---|---|---|
| EP | 3330409 | 6/2018 |
| EP | 3819401 | 5/2021 |
| WO | 9222096 | 12/1992 |
| WO | 2024097191 | 5/2024 |

OTHER PUBLICATIONS

"International Application Serial No. PCT US2023 036418, International Search Report mailed May 17, 2024", 5 pgs.
"International Application Serial No. PCT US2023 036418, Written Opinion mailed May 17, 2024", 6 pgs.

* cited by examiner

*Primary Examiner* — Stephan J Essex
(74) *Attorney, Agent, or Firm* — Schwegman Lundberg & Woessner, P.A.

(57) ABSTRACT

An electrochemical electrode assembly comprises an electrode having a first electrode face and a second electrode face opposing the first electrode face, a support member configured to be coupled to a housing of an electrolyzer cell, an elastic element comprising a plurality of resilient filaments coupled together into a resilient body, wherein the elastic element is compressed between the support member and the electrode so that the elastic element generates a controlled load against the first electrode face, and a protective insert abutted against the second electrode face along at least a portion of a first edge of the electrode, wherein the protective insert prevents filaments of the elastic element from protruding beyond the second electrode face.

7 Claims, 8 Drawing Sheets

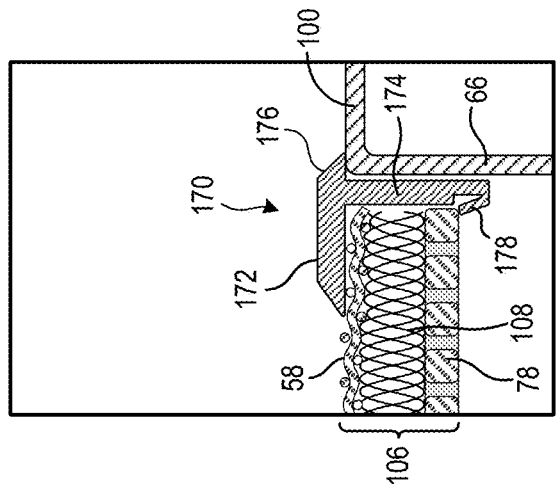
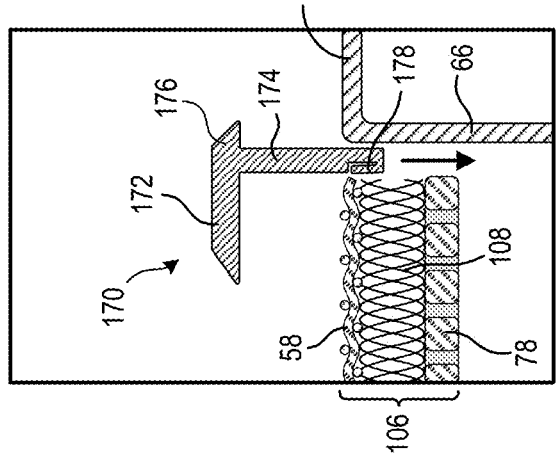
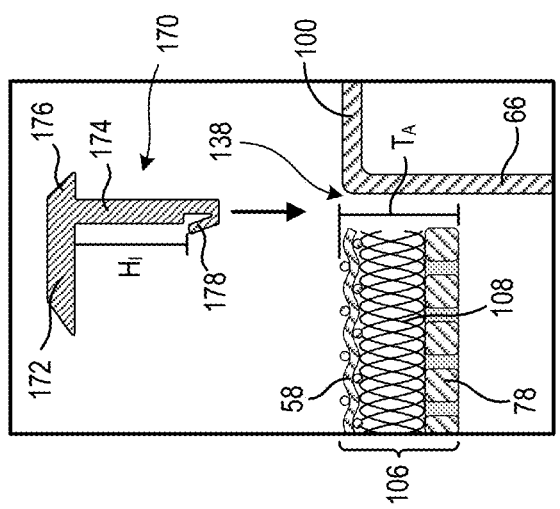
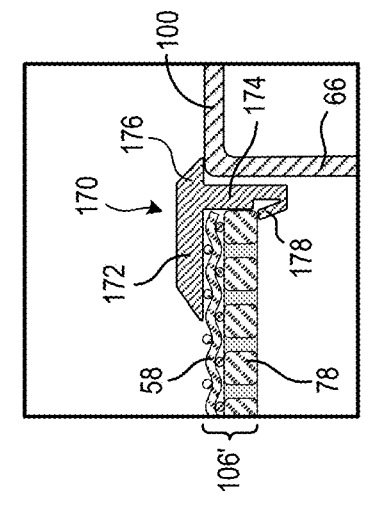
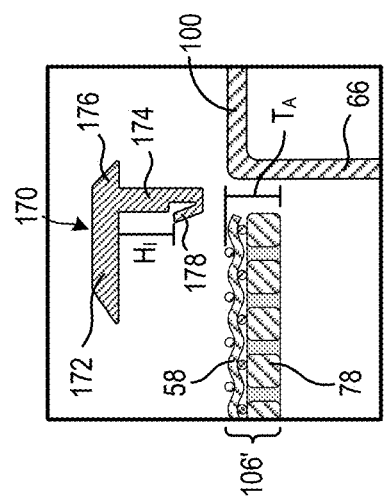

PROTECTIVE INSERT FOR ELECTROCHEMICAL CELL

CROSS-REFERENCE TO RELATED APPLICATION

This application claims priority under 35 U.S.C. § 119(e) to U.S. Provisional Application Ser. No. 63/381,682, filed on Oct. 31, 2022, entitled "PROTECTIVE INSERT FOR ELECTROCHEMICAL CELL," the disclosure of which is incorporated herein by reference in its entirety.

BACKGROUND

Water electrolysis uses electricity to split water molecules into hydrogen gas and (optionally) oxygen gas. In some examples, electrochemical cells for hydrogen-producing water electrolysis include a separator located between an anode and a cathode. Reducing or minimizing overall cell voltage is an economic priority. Utilizing zero-gap cell architecture, wherein the separator is in contact with one or both electrodes, often under mechanical loading, is one means of reducing or minimizing overall cell voltage. Reducing separator thickness is another. Commercially produced separators, which are often ion exchange membranes, can be very thin, e.g., with a thickness of 5 micrometers or less. A zero-gap architecture can also include a compliant or elastic element, often referred to as a "mattress," which can produce a controlled load to bias one or both of the electrodes toward the separator. Mattresses often include a structure of corrugated and/or woven wires or wire-like elements. It is common for wires or wire-like elements to protrude from an edge of the mattress and have been known to puncture or otherwise damage the separator.

SUMMARY

The present disclosure describes an electrochemical cell, such as a cell used for water-splitting electrolysis to produce hydrogen gas ($H_2$), that includes a protective insert that can be positioned at an edge of a resilient element comprising a plurality of filamentous structures, such as a woven compressible mattress that comprises a plurality of resilient filaments. The protective insert can be positioned between the filamentous structure and a separator of the electrochemical cell so that the likelihood of a filamentous structure puncturing or otherwise damaging the separator is reduced.

The present disclosure describes an electrochemical cell comprising a separator and at least one half cell that includes an electrode and an elastic element comprising a plurality of resilient filamentous structures that provides a specified load to compress the electrode into the separator, wherein the electrode is between the elastic element and the separator, and a protective insert positioned along an edge of the elastic element, wherein the protective insert provides a barrier between one or more of the plurality of resilient filamentous structures and the separator.

In an example, the present disclosure includes an electrochemical electrode assembly comprising an electrode having a first electrode face and a second electrode face opposing the first electrode face, a support member configured to be coupled to a housing of an electrolyzer cell, an elastic element comprising a plurality of resilient filaments coupled together into a resilient body, wherein the elastic element is compressed between the support member and the electrode so that the elastic element generates a controlled load against the first electrode face. The electrode assembly also includes a protective insert abutted against the second electrode face along at least a portion of a first edge of the electrode, wherein the protective insert prevents filaments of the elastic element from protruding beyond the second electrode face.

In another example, the present disclosure describes an electrolyzer cell comprising a housing at least partially enclosing a cell interior, a first electrode assembly, and a second electrode assembly. The first electrode assembly comprises a first electrode having a first face of the first electrode and a second face of the first electrode opposing the first face of the first electrode, a support member coupled to the housing, and an elastic element comprising a plurality of resilient filaments coupled together into a resilient body. The elastic element is compressed between the support member and the first electrode so that the elastic element generates a controlled load against the first face of the first electrode. The second electrode assembly comprises a second electrode having a first face of the second electrode and a second face of the second electrode that opposes the first face of the second electrode. The second electrode assembly is coupled to the housing. The electrolyzer cell also includes a separator positioned between the first electrode and the second electrode. The separator has a first separator face that is proximate to the second face of the first electrode and a second separator face opposing the first separator face that is proximate to the second face of the second electrode. The controlled load generated by the elastic element biases the first electrode toward the separator so that the second face of the first electrode is in contact with the first separator face. Finally, the electrolyzer cell includes a protective insert abutted against the second face of the first electrode along at least a portion of a first edge of the first electrode. The protective insert prevents filaments of the elastic element from protruding into the first separator face proximate to the first edge of the first electrode.

BRIEF DESCRIPTION OF THE FIGURES

The drawings illustrate generally, by way of example, but not by way of limitation, various embodiments discussed in the present document.

FIGS. 13A-13C show close-up cross-sectional views of a process of installing an example protective insert onto an example electrode assembly.

FIGS. 14A and 14B show close-up cross-sectional views of a process of installing the example protective insert onto another example electrode assembly.

DETAILED DESCRIPTION

Figure 1:
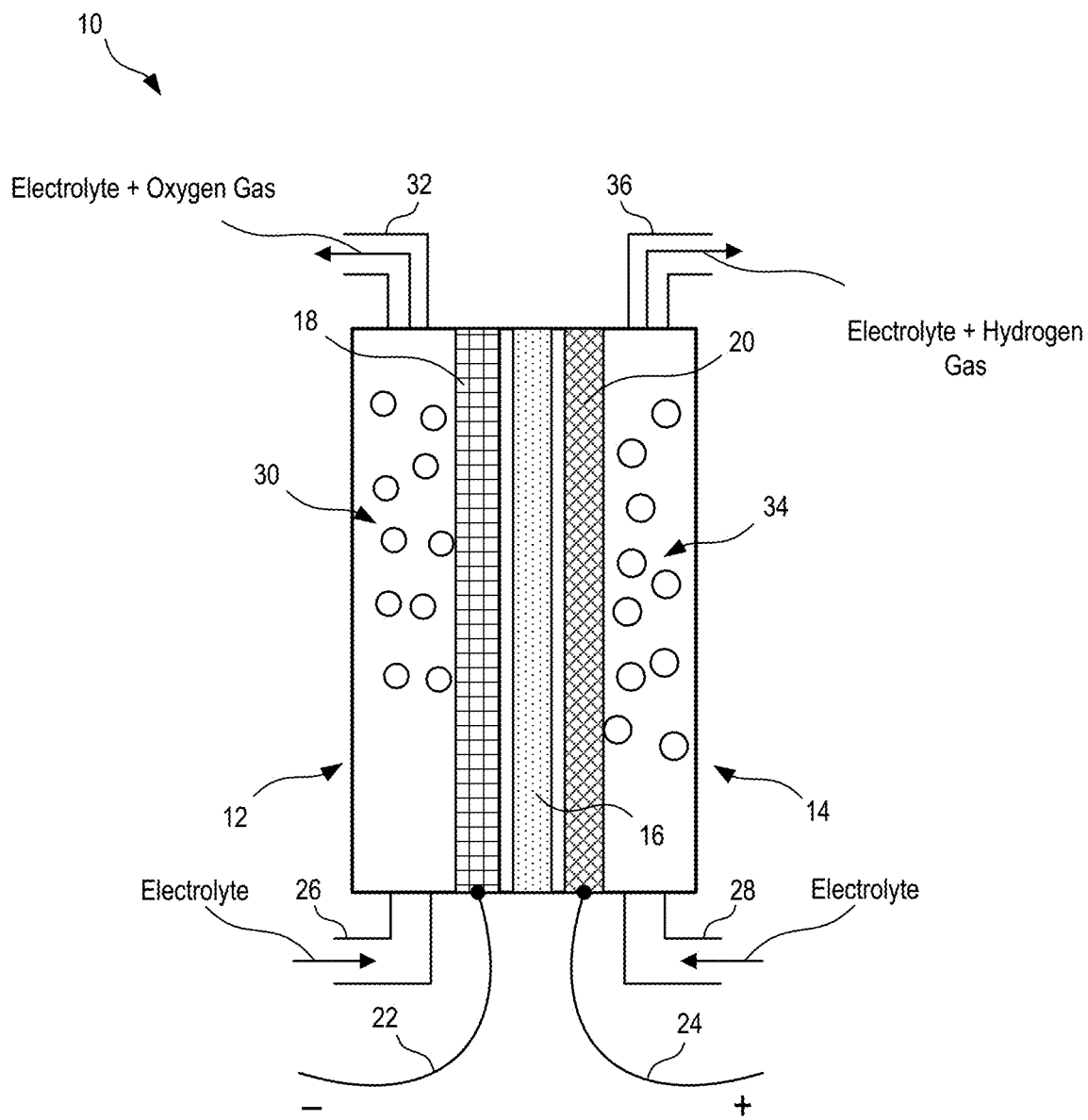
FIG. 1 is a schematic diagram of an example electrolyzer cell for the electrolysis of water.

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The example embodiments may be combined, other embodiments may be utilized, or structural, and logical changes may be made without departing from the scope of the present invention. While the disclosed subject matter will be described in conjunction with the enumerated claims, it will be understood that the exemplified subject matter is not intended to limit the claims to the disclosed subject matter. The following detailed description is, therefore, not to be taken in a limiting sense, and the scope of the present invention is defined by the appended claims and their equivalents.

References in the specification to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a recited range of values of "about 0.1 to about 5" should be interpreted to include not only the explicitly recited values of about 0.1 and about 5, but also all individual concentrations within the indicated range of values (e.g., 1, 1.23, 2, 2.85, 3, 3.529, and 4, to name just a few) as well as sub-ranges that fall within the recited range (e.g., about 0.1 to about 0.5, about 1.21 to about 2.36, about 3.3 to about 4.9, or about 1.2 to about 4.7, to name just a few). The statement "about X to Y" has the same meaning as "about X to about Y,"" unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. Unless indicated otherwise, the statement "at least one of" when referring to a listed group is used to mean one or any combination of two or more of the members of the group. For example, the statement "at least one of A, B, and C" can have the same meaning as "A; B; C; A and B; A and C; B and C; or A, B, and C," or the statement "at least one of D, E, F, and G" can have the same meaning as "D; E; F; G; D and E; D and F; D and G; E and F; E and G: F and G; D, E, and F; D, E, and G; D, F, and G; E, F, and G; or D, E, F, and G." A comma can be used as a delimiter or digit group separator to the left or right of a decimal mark; for example, "0.000,1"" is equivalent to "0.0001."

In the methods described herein, the steps can be carried out in any order without departing from the principles of the invention, except when a temporal or operational sequence is explicitly recited. Furthermore, specified steps can be carried out concurrently unless explicit language recites that they be carried out separately. For example, a recited act of doing X and a recited act of doing Y can be conducted simultaneously within a single operation, and the resulting process will fall within the literal scope of the process. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E (including with one or more steps being performed concurrent with step A or Step E), and that the sequence still falls within the literal scope of the claimed process. A given step or sub-set of steps can also be repeated.

Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

The term "about" as used herein can allow for a degree of variability in a value or range, for example, within 10%, within 5%, within 1%, within 0.5%, within 0.1%, within 0.05%, within 0.01%, within 0.005%, or within 0.001% of a stated value or of a stated limit of a range, and includes the exact stated value or range.

The term "substantially" as used herein refers to a majority of, or mostly, such as at least about 50%, 60%, 70%, 80%, 90%, 95%, 96%, 97%, 98%, 99%, 99.5%, 99.9%, 99.99%, or at least about 99.999% or more, or 100%.

In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Electrolyzer Cell

Hydrogen gas ($H_2$) can be formed electrochemically by a water-splitting reaction where water is split into $H_2$ gas and (optionally) oxygen gas ($O_2$) at a cathode and an anode of an electrochemical cell, respectively. Examples of such electrochemical processes include, without limitation, proton electrolyte membrane (PEM) electrolysis and alkaline water electrolysis (AWE). In such electrochemical reactions, the operating energy necessary to drive the water-splitting electrolysis reaction is high due to additional energy costs as a result of various energy inefficiencies. For example, to reduce unwanted migration of ionic species between the electrodes, the cathode and the anode may be separated by a separator, such as a membrane, which can reduce migration of the ionic species. Although the separator can improve the overall efficiency of the cell, it can come at a cost of additional resistive losses in the cell, which in turn increases the operating voltage. Other inefficiencies in water electrolysis can include solution resistance losses, electric conduction inefficiencies, and/or electrode over-potentials, among others.

FIG. 1 is a schematic diagram of a generic water electrolyzer cell 10 that converts water ($H_2O$) into hydrogen gas ($H_2$) and oxygen gas ($O_2$) with electrical power. In an example, the electrolyzer cell 10 comprises a housing, e.g., an overall chassis structure that defines and at least partially encloses an interior of the cell 10. The housing can divide the cell 10 into two half cells: a first half cell 12 and a second half cell 14. In an example, the first and second half cells 12, 14 are separated by a separator 16, such as a membrane. In an example, the separator 16 comprises a porous membrane (e.g., a microporous membrane or a nanoporous membrane), an ion-exchange membrane, or an ion solvating membrane. In examples wherein the separator 16 comprises an ion-exchange membrane, the membrane can be of different types, such as an anion exchange membrane (AEM), a cation exchange membrane (CEM), a proton exchange membrane (PEM), or a bipolar ion exchange membrane (BEM).

In examples where the separator 16 is a cation exchange membrane, the cation exchange membrane can be a conventional membrane such as those available from, for example, Asahi Kasei Corp. of Tokyo, Japan, or from Membrane International Inc. of Glen Rock, NJ, USA, or from The Chemours Company of Wilmington, DE, USA. Examples of cation exchange membranes include, but are not limited to, the membrane sold under the N2030 WX trade name by The Chemours Company, and the membrane sold under the F8020/F8080 or F6801 trade names by the Asahi Kasei Corp. Examples of materials that can be used to form a cationic exchange membrane include, but are not limited to, a perfluorinated polymer containing anionic groups, for example sulphonic and/or carboxylic groups. It may be appreciated, however, that in some examples, depending on the need to restrict or allow migration of a specific cation or an anion species between the electrolytes, a cation exchange membrane that is more restrictive and thus allows migration of one species of cations while restricting the migration of another species of cations may be used. Similarly, in some embodiments, depending on the need to restrict or allow migration of a specific anion species between the electrolytes, an anion exchange membrane that is more restrictive and thus allows migration of one species of anions while restricting the migration of another species of anions may be used. Such restrictive cation exchange membranes and anion exchange membranes are commercially available and can be selected by one ordinarily skilled in the art.

In some examples, the separator 16 can be selected so that it can function in an acidic and/or an alkaline electrolytic solution, as appropriate. Other properties for the separator 16 that may be desirable include, but are not limited to, high ion selectivity, low ionic resistance, high burst strength, and high stability in electrolytic solution in a temperature range of room temperature to 150° C. or higher.

In an example, the separator 16 is stable in a temperature range of from about 0° C. to about 150° C., for example from about 0° C. to about 100° C., such as from about 0° C. to about 90° C., for example from about 0° C. to about 80° C., such as from about 0° C. to about 70° C., for example from about 0° C. to about 60° C., such as from about 0° C., to about 50° C., for example from about 0° C. to about 40° C., or such as from about 0° C. to about 30° C.

It may be useful to use an ion-specific ion exchange membrane that allows migration of one type of ion (e.g., cation for a CEM and anion for an AEM) but not another, or migration of one type of ion and not another, to achieve a desired product or products in the electrolyte solution.

In an example, the first half cell 12 comprises a first electrode 18, which can be placed proximate to the separator 16, and the second half cell 14 comprises a second electrode 20, which can be placed proximate to the separator 16, for example on an opposite side of the separator 16 from the first electrode 18. In an example, the first electrode 18 is the anode for the electrolyzer cell 10 and the second electrode 20 is the cathode for the electrolyzer cell 10, such that for the remainder of the present disclosure the first half cell 12 may also be referred to as the anode half cell 12, the first electrode 18 may also be referred to as the anode 18, the second half cell 14 may also be referred to as the cathode half cell 14, and the second electrode 20 may also be referred to as the cathode 20. In an example, described in more detail below, each electrode 18, 20 can comprise a high surface area metal, such as a fine metal mesh. In an example, each electrode 18, 20 comprises a nickel mesh.

The electrodes 18, 20 are the locations of the cell 10 where the electron transfer reactions occur—e.g., oxidation of $OH^-$ at the anode 18 to produce $O_2$ gas or reduction of $H_2O$ at the cathode 20 to produce $H_2$ gas. Each of the electrodes 18, 20 can be coated with one or more electrocatalysts to speed the reaction toward the hydrogen gas ($H_2$ gas) and/or the oxygen gas ($O_2$ gas). In a typical example, one of both of the electrodes 18, 20 comprises a conductor substrate, such as a nickel substrate body, with an electrocatalyst coated onto one or more surfaces of the conductor substrate. In most cases, the electrocatalyst lowers the activation energy for the electrochemical reaction so that the reaction can proceed without the electrocatalyst being consumed by the reaction. By lowering the activation energy, an electrocatalyst is able to facilitate specific reactions at the electrode so that the electrochemical device has a reduced energy demand.

Examples of electrocatalyst materials include, but are not limited to, metals, metal alloys, metal-metalloid alloys, metal oxides, metal phosphides, and metal sulfides. Further details of some specific examples of electrocatalyst materials that can be applied to one or both electrodes 18, 20 are described in more detail below.

The ohmic resistance of the separator 16 can affect the voltage drop across the anode 18 and the cathode 20 (and thus, the overall efficiency of the system). For example, as the ohmic resistance of the separator 16 increases, the voltage across the anode 18 and the cathode 20 that is required may also increase, and vice versa. In an example, the separator 16 has a relatively low ohmic resistance and a relatively high ionic mobility. In an example, the separator 16 has a relatively high hydration characteristics that increase with temperature, and thus decreases the ohmic resistance. By selecting a separator 16 with lower ohmic resistance known in the art, the voltage drop across the anode 18 and the cathode 20 at a specified temperature can be lowered.

In an example, the anode 18 is electrically connected to an external positive conductor 22 (also referred to as "the anode conductor 22") and the cathode 20 is electrically connected to an external negative conductor 24 (also referred to as "the cathode conductor 24"). In an example, when the separator 16 is wet and is in electrolytic contact with the electrodes 18, 20, and an appropriate voltage is applied across the conductors 22 and 24, $O_2$ gas is liberated at the anode 18 and $H_2$ gas is liberated at the cathode 20. In certain configurations, an electrolyte, e.g., one comprising of a solution of potassium hydroxide (KOH) in water, is fed into the half cells 12, 14. For example, the electrolyte can flow into the anode half cell 12 through a first electrolyte inlet 26 and into the cathode half cell 14 through a second electrolyte inlet 28. In an example, the flow of the electrolyte through the anode half cell 12 picks up produced $O_2$ gas as bubbles 30 and exits the anode half cell 12 through a first outlet 32. Similarly, the flow of the electrolyte through the cathode half cell 14 can pick up produced $H_2$ gas as bubbles 34 and can exit the cathode half cell 14 through a second outlet 36. The gases can be separated from the electrolyte downstream of the electrolyzer cell 10 with one or more appropriate separators. In an example, the produced $H_2$ gas is dried and harvested into high pressure canisters or fed into further process elements. The $O_2$ gas can be allowed to simply vent into the atmosphere or can be stored for other uses. In an example, the electrolyte is recycled back into the half cells 12, 14 as needed.

In an example, a typical voltage across the electrolyzer cell 10 (e.g., the voltage difference between the anode conductor 22 and the cathode conductor 24) is from about 1.5 volts (V) to about 3.0 V. In an example, an operating current density for the electrolyzer cell 10 is from about 0.1 $A/cm^2$ to about 3 $A/cm^2$. Each cell 10 has a size that is sufficiently large to produce a sizeable amount of $H_2$ gas when operating at these current densities. In an example, an active area of each cell 10 (e.g., a width multiplied by a height for a rectangular cell) is from about 0.25 square meters ($m^2$) to about 15 $m^2$, such as from about 1 $m^2$ to about 5 $m^2$, for example from about 2 $m^2$ to about 4 $m^2$, such as from about 2.25 $m^2$ to about 3 $m^2$, such as from about 2.5 $m^2$ to about 2.9 $m^2$. In an example, the total volume of each cell (e.g., a width multiplied by a height multiplied by a depth) is from about 0.1 cubic meter ($m^3$) to about 2 $m^3$, such as from about 0.15 $m^3$ to about 1.5 $m^3$, for example from about 0.2 $m^3$ to about 1 $m^3$, such as from about 0.25 $m^3$ to about 0.5 $m^3$, for example from about 0.275 $m^3$ to about 0.3 $m^3$. In a non-limiting example, the total volume of the entire electrolyzer system (e.g., the combined volume of all the cells in all the stacks in the plant) is from about 1 $m^3$ to about 25,000 $m^3$, such as from about 5 $m^3$ to about 2,500 $m^3$, for example from about 10 $m^3$ to about 100 $m^3$, such as from about 25 $m^3$ to about 75 $m^3$, for example from about 30 $m^3$ to about 50 $m^3$.

Zero-Gap Architecture

The efficiency of an electrolyzer cell can depend on resistive losses between the anode and cathode. One parameter that can affect ohmic resistance between the electrodes is the distance between the anode and the cathode, with a larger gap between the electrodes resulting in a correspondingly larger resistance compared to a smaller gap. Therefore, in an example, an electrolyzer cell can be configured so that the space or gap between the anode and the cathode is as small as possible. One or both of the electrodes can be positioned to be in contact with the separator, which is also referred to as a "zero-gap" configuration. In an example of a zero-gap configuration, one face or surface of the anode is in contact with a first separator face and one face or surface of the cathode is in contact with a second separator surface that opposes the first separator face. A zero-gap architecture can minimize or eliminate fluid gaps between the electrodes and the separator which are known to be relatively resistive. Fluid-gap reduction, in turn, reduces the distance between the electrodes, thereby minimizing a dominant source of high cell voltages.

Figure 2:
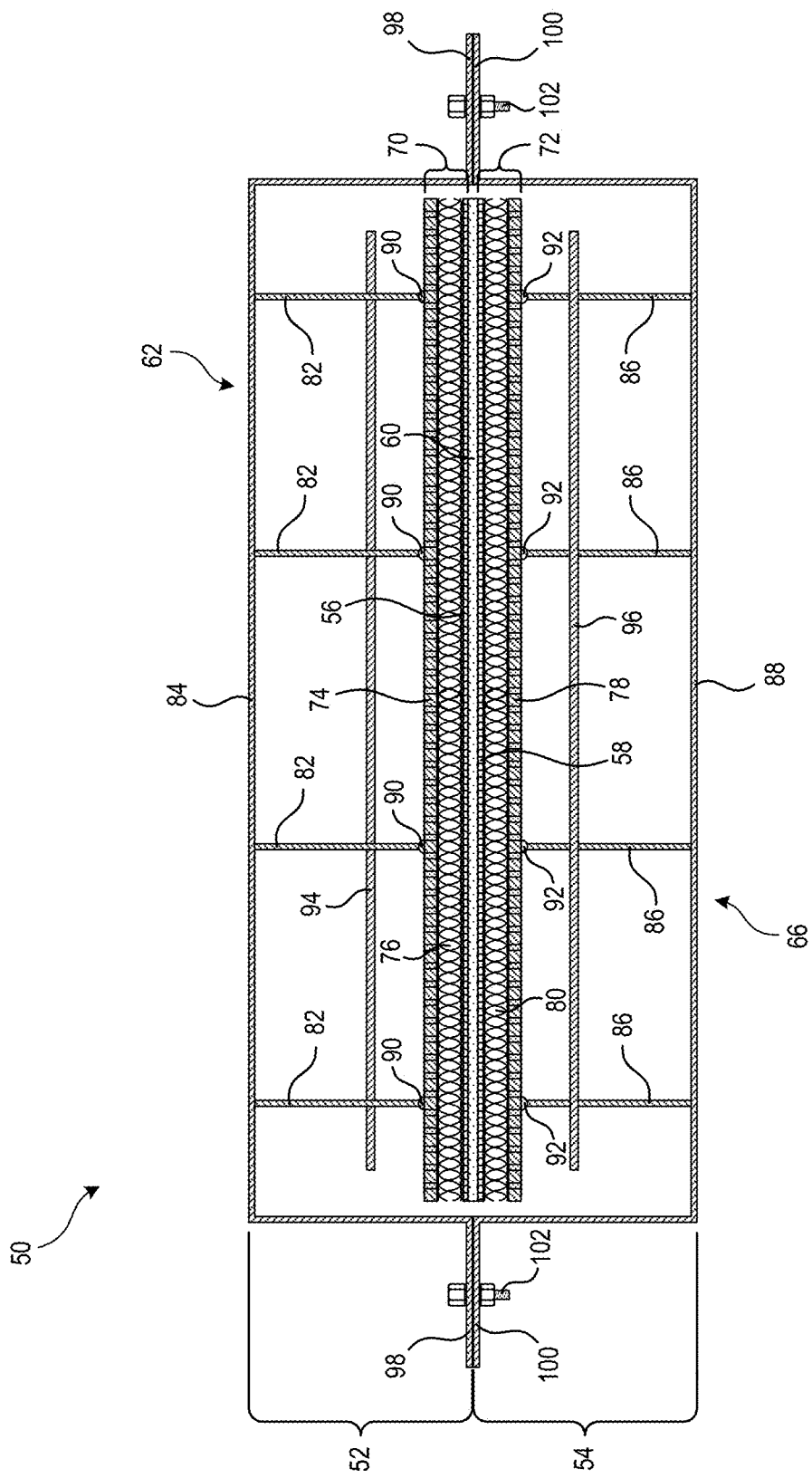
FIG. 2 is a cross-sectional view of an example electrolyzer cell comprising an anode pan assembly and a cathode pan assembly separated by a separator.
Figure 3:
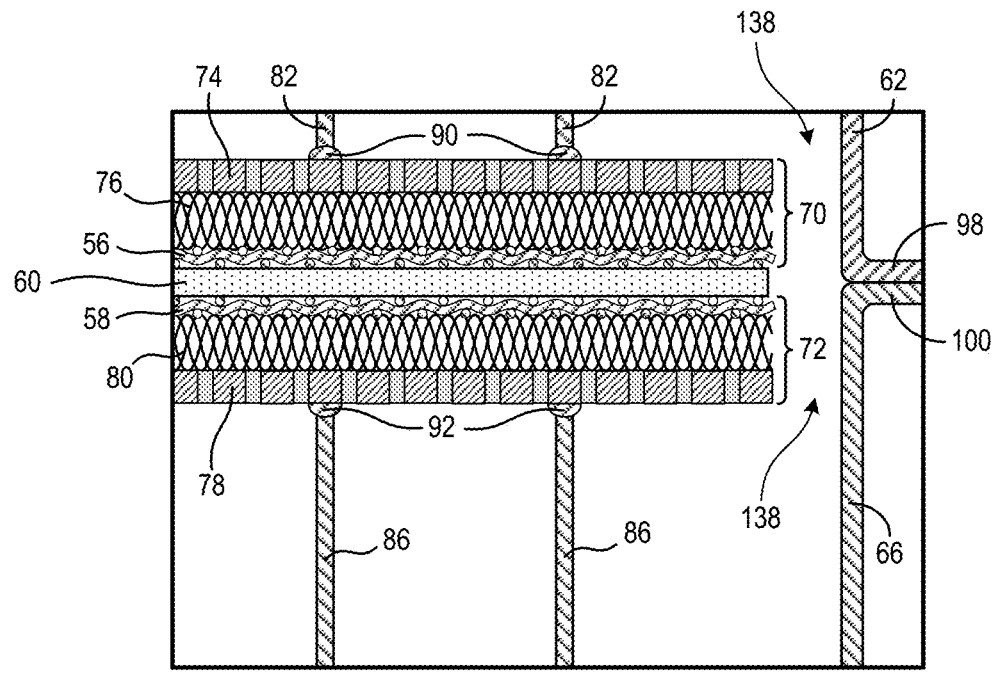
FIG. 3 is a close-up cross-sectional view of an example anode assembly and cathode assembly that can be used in the example electrolyzer cell of FIG. 2.
Figure 4:
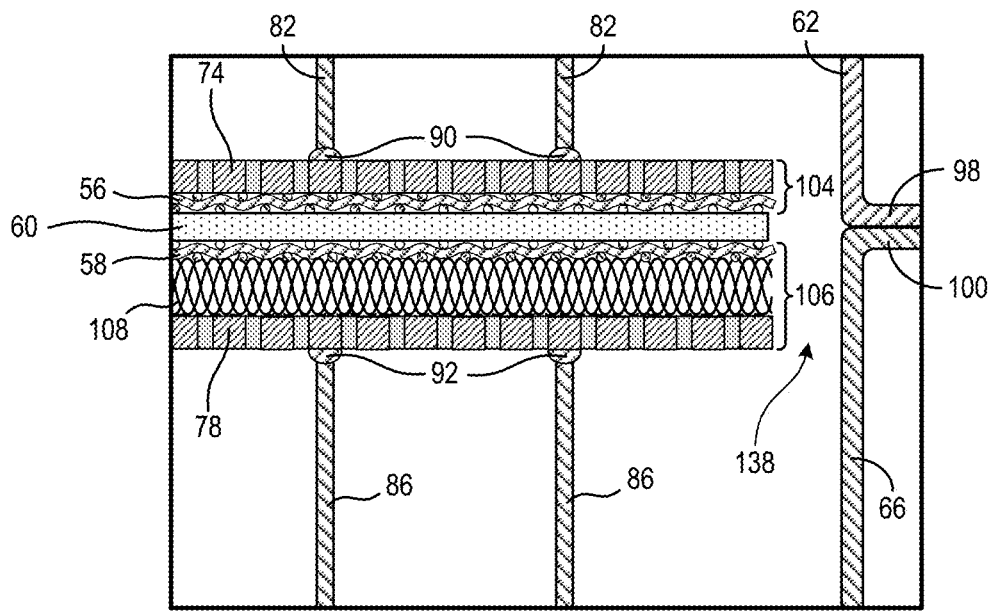
FIG. 4 is a close-up cross-sectional view of another example anode assembly and cathode assembly that can be used in the example electrolyzer cell of FIG. 2.

FIGS. 2-4 show examples of electrolyzer cells have a zero-gap architecture, e.g., with one or both electrodes compressed against the separator. FIG. 2 shows an overall cross-sectional view of an example electrolyzer cell 50 that includes pan assemblies 52, 54 that provide for a zero-gap architecture. FIGS. 3 and 4 are close-up cross-sectional views of electrode assemblies that can be used in the example electrolyzer cell 50 of FIG. 2.

In an example, the pan assemblies 52, 54 of the electrolyzer cell 50 form a housing that at least partially encloses a cell interior, wherein the electrodes 56, 58 are coupled to the housing and are enclosed within the cell interior. Each electrode 56, 58 can be part of a corresponding half cell. For example, the first electrode 56 can be included as part of a first half cell and the second electrode 58 can be included as part of a second half cell. In a non-limiting example, the first electrode 56 is the anode of the electrolyzer cell 50 and the second electrode 58 is the cathode of the electrolyzer cell 50. Therefore, the electrodes 56, 58 may also be referred to herein as the "anode 56" and the "cathode 59," the corresponding half cells may also be referred to herein as the "anode half cell" and the "cathode half cell," and other aspects of each half cell may be referred to herein as the "anode-side" or the "cathode-side" of the electrolyzer cell 50. However, those having skill in the art will appreciate that the specific orientation of the anode half cell and the cathode half cell shown and described herein are not limited and are merely provided for convenience of description. In addition, there are instances when the anode 56 and the cathode 58 are referred to more generically as "the electrode 56, 58" or "the electrodes 56, 58."

A separator 60 is situated between the anode half cell and the cathode half cell, for example by being positioned between the anode 56 and the cathode 58. In an example, both of the electrodes 56, 58 and the separator 60 have a first face (e.g., a top face as depicted in the orientation of FIG. 2) and a second face that opposes the first face (e.g., a bottom face as depicted in the orientation of FIG. 2). For example, a bottom face of the anode 56 can be proximate to or abutted against the top face of the separator 60, and a top face of the cathode 58 can be proximate to or abutted against the bottom face of the separator 60. In an example, both of the electrodes 56, 58 and the separator 60 are planar or substantially planar (as shown in FIG. 2). In an example, both of the electrode 56, 58 and the separator 16 have a rectangular or generally rectangular cross-section.

As discussed above, the separator 60 can be configured to reduce migration of certain selected species between the electrodes 56, 58 while allowing one or more other species to pass from the anode half cell to the cathode half cell and/or from the cathode half cell to the anode half cell. In an example, the separator 60 comprises a diaphragm, a membrane electrode assembly (MEA), or a membrane, such as an ion exchange membrane (IEM) (e.g., an anion exchange membrane (AEM), a cation exchange membrane (CEM), or a proton exchange membrane (PEM)), a bipolar ion exchange membrane (BEM), an ion solvating membrane (ISM), or a microporous or nanoporous membrane. In some examples, the separator 60 can comprise more than one type of separator, e.g., more than one type of membrane (as is the case with a bipolar ion exchange membrane), and/or can be part of a composite structure (such as a membrane electrode assembly (MEA)), which can also include one or more separator components (e.g., to separate an anion exchange membrane (AEM) from a cation exchange membrane (CEM)), or one or more support structures to provide mechanical integrity to the one or more separators. In addition to these components, individual gaskets or gasket tape may be provided in between and along the outer perimeter of the components to seal the compartments from fluid leakage.

As discussed above, in an example, one or both of the electrodes 56, 58 are situated in a "zero-gap" configuration relative to the separator 60. Although the term "zero-gap" would typically imply that one or both electrodes 56, 58 are in actual physical contact with the separator 60, in the present disclosure, the term "zero-gap" may also be used to mean that all structures between the two current collectors 74, 78 (described below) are in mechanical contact, with no space for the liquid electrolyte to congregate. In other words, there could be one or more spacer materials inserted between one or both of the current collectors 74, 78 and the separator 60, and the overall structure would still be considered a "zero-gap architecture" if there is not a liquid electrolyte gap between the two current collectors 74, 78.

The housing of the cell 50 can comprise a pan assembly for one or both of the half cells. In an example, each pan assembly includes a pan with an interior for receiving an electrolyte. For example, the anode half cell can include an anode pan assembly 52 that comprises an anode-side pan 62 for receiving an anolyte, while the cathode half cell can include a corresponding cathode pan assembly 54 that comprises a cathode-side pan 66 for receiving a catholyte. The pan assemblies 52, 54 can be configured so that electrolyte solution flowing through the pans 62, 66 will come into contact with its corresponding electrode 56, 58, e.g., so that $H_2$ gas can be evolved from the cathode 58. In some examples, $O_2$ gas can be evolved from the anode 56. Each pan assembly 52, 54 can also include an inlet for receiving electrolyte into the interior of the pan 62, 66, and one or more outlets so that electrolyte and evolved gas can exit the pan 62, 66 (not shown).

In an example, each electrode is electrically connected to its corresponding pan so that electrical current can flow from the pan to the electrode (as is the case for current flowing from an anode-side pan 62 to an anode 56) or from the electrode to the pan (as is the case for current flowing from a cathode 58 to a cathode-side pan 66). Each half cell can include one or more additional structures to provide for the electrical connection between the electrodes 56, 58 and the pans 62, 66. In an example, one or both of the electrodes 56, 58 are part of a corresponding electrode assembly comprising the electrode and one or more additional structures. For example, the first electrode 56 (e.g., the anode 56) can be part of a first electrode assembly 70 (which will also be referred to herein as "the anode assembly 70") and the second electrode 58 (e.g., the cathode 58) can be part of a second electrode assembly 72 (which will also be referred to herein as "the cathode assembly 72").

In an example, one or both of the electrode assemblies 70, 72 include, in addition to the corresponding electrode 56, 58, a support member onto which the corresponding electrode 56, 58 can be coupled, and an optional elastic element (also referred to as a "mattress"). For example, the anode assembly 70 can include the anode 56, an anode-side support member 74, and an optional anode-side elastic element 76, while the cathode assembly 72 can include the cathode 58, a cathode-side support member 78, and an optional cathode-side elastic element 80.

The support members 74, 78 can be configured to be coupled to the housing of the electrolyzer cell 50, e.g., to a corresponding one of the pans 62, 66. Each support member 74, 78 also can provide a structure onto which the corresponding electrode 56, 58 and (if present) the corresponding elastic element 76, 80 can be coupled to form the overall electrode assembly 70, 72. In an example, one or both of the support members 74, 78 are planar or substantially planar. One or both of the support members 74, 78 can be rectangular or substantially rectangular in cross-sectional shape. Examples of the support member 74, 78 include a metal support plate or an expanded metal mesh.

Each electrode assembly 70, 72 can be coupled to its respective pan 62, 66, i.e., so that there is an electrical connection between the anode 56 and the anode-side pan 62 and between the cathode 58 and the cathode-side pan 66. In an example, one or both of the electrodes 56, 58 comprise a fine mesh structure, such as a fine woven mesh (described in more detail below). A fine mesh, such as a woven mesh, have been found to make an excellent electrode for electrolyzer cells because it provides a high relative surface area, a relatively large open area for electrolyte and gas flow to and from the electrode, and are readily available in sizes that are large enough for a large commercial electrolyzer cell, e.g., with an active area of at least 1 $m^2$, such as from about 1 $m^2$ to about 4 $m^2$.

In an example, a differential fluid pressure can be applied across the separator 60 (e.g., with a pressure on the cathode side of the separator 60 being larger than on the anode side, or vice versa). The differential pressure, in addition to the elastic element 76, 80 can act to load one or both of the electrodes 56, 58 and create effective electrical contact across the active area of one or both electrodes 56, 58. The differential pressure and/or one or more elastic elements 76, 80 can also ensure good contact between one or both of the electrodes 56, 58 and the separator 60.

In an example, the woven mesh of one or both of the electrodes 56, 58 comprises a network of sets of crossing wires, which can be perpendicular or angled relative to one another, that alternatively cross and bend over one another. For example, any particular wire can alternate between passing under an adjacent cross wire and then over the next cross wire. In an example, one or both of the electrodes 56, 58 can comprise a woven wire mesh electrode formed from wires having a wire diameter of about 0.18 mm diameter with openings in the mesh of about 0.44 mm and with an open area of from about 50% to about 60%, such as from about 50% to about 55%. In an example, one or both of the electrodes 56, 58 is formed from an expanded mesh wherein one or both of the electrodes 56, 58 are fabricated from a sheet of material that is about 0.13 mm thick with a long way of the diamond shape (LWD) of about 2 mm and a short way of the diamond (SWD) of about 1 mm.

In an example, one or both of the electrodes 56, 58 is made primarily or entirely from nickel. One or both of the electrodes 56, 58 can be coated with one or more catalyst materials, e.g., in the form of one or more catalyst coating layers on the electrode 56, 58. In an example, the one or more catalyst materials can be electrically conducting.

In an example, one or both of the support members 74, 78 of the electrode assemblies 70, 72 are configured to distribute current to the corresponding electrode (in the case of the anode-side support member 74 and the anode 56) or to collect current from the corresponding electrode (in the case of the cathode-side support member 78 and the cathode 58). A structure that collects or distributes current within an electrolyzer cell is often referred to as a "current collector." Therefore, for the remainder of the present disclosure, the anode-side support member 74 will also be referred to as the "anode current collector 74" and the cathode-side support member 78 will also be referred to as the "cathode current collector 78." In an example, the current collector 74, 78 of each electrode assembly 70, 72 comprises a rigid structure, such as a rigid metal plate or mesh, which is electrically connected to its corresponding electrode 56, 58 and its corresponding pan 62, 66, either directly or indirectly.

In an example, each elastic element 76, 80 comprises a compressible and expandable structure that provides a controlled load when compressed. For example, the elastic element 76, 80 can be compressed between the separator 60 and the current collector 74, 78, and the resulting load that results as the elastic element 76, 80 tries to expand back to its fully expanded position acts to load the electrode 56, 58 against the separator 60 to provide a zero-gap configuration between the electrode 56, 58 and the separator 60. In an example, the elastic element 76, 80 is also electrically conductive (e.g., the elastic element 76, 80 is made from or is coated with an electrically conductive material, such as nickel) so that it will conduct electricity from the current collector 74, 78 to the electrode 56, 58 or vice versa. In an example, each of the one or more elastic elements 76, 80 comprise one or more resilient filaments that are woven or otherwise coupled together into a resilient body that can be compressed and will act to expand back to its original form to apply a specified controlled load when the elastic layer is compressed. In an example, the resilient filaments of one or both of the elastic elements 76, 80 can be made from an electrically conductive material or that are at least partially coated with an electrically conductive material. In some examples, one or both of the elastic elements 76, 80 can include a corrugated knitted mesh having a pre-load of about 2 pounds per square inch at about 3 mm of compression. In an example, an uncompressed thickness of one or both of the elastic elements 76, 80 can be from about 5 mm to about 7 mm. One or both of the elastic elements 76, 80 can have a corrugation pitch of about 10 mm. In an example, one or both of the elastic elements 76, 80 are formed from wire having a wire diameter of about 0.15 mm.

In the example shown in FIGS. 2 and 3, both the anode assembly 70 and the cathode assembly 72 include an elastic element 76, 80, e.g., such that the anode-side elastic element 76 provides a first loading force that biases the anode 56 toward a first separator face and the cathode-side elastic element 80 provides a second loading force that biases the cathode 58 toward a second separator face that opposes the first separator face. In other examples, discussed in more detail below with respect to FIG. 4, there is an elastic element on only one side of the separator 60 (e.g., with only the anode assembly having an elastic element and with the cathode assembly omitting the elastic element, or vice versa with only the cathode assembly having an elastic element and with the anode assembly omitting the elastic element). In such a configuration, the elastic element on only one side of the separator 60 can be configured to produce enough compressive load so that both electrodes 56, 58 are compressed against the opposing sides of the separator 60, e.g., so that one of the electrodes 56, 58 is biased toward the separator 60, and then that electrode 56, 58 and the separator 60 are both biased toward the other electrode 56, 58.

In an example, one or more, and in some examples all, of the structures of one or both of the electrode assemblies 70, 72 are planar or substantially planar, as shown in FIG. 3. For example, one or more of, and in some examples all three of, the anode 56, the anode current collector 74, and the anode-side elastic element 76 can be planar or substantially planar. Similarly, one or more of, and in some examples all of, the cathode 58, the cathode current collector 78, and the cathode-side elastic element 80 can be planar or substantially planar. In an example, one or more, and in some examples all, of the structures of one of both of the electrode assemblies 70, 72 are rectangular or substantially rectangular is cross-sectional shape. For example, one or more of, and in some examples all three of, the anode 56, the anode current collector 74, and the anode-side elastic element 76 can be rectangular or substantially rectangular. Similarly, one or more of, and in some examples all of, the cathode 58, the cathode current collector 78, and the cathode-side elastic element 80 can be rectangular or substantially rectangular.

In an example, the current collectors 74, 78 can be coupled to their respective pans 62, 66, e.g., so that the current collector 74, 78 is electrically connected to the pan 62, 66, which provides an electrical path between the electrode 56, 58 and the pan 62, 66. In order to accommodate the electrical connection, in an example each pan assembly 52, 54 includes one or more conductive ribs that extend between the electrode assembly 70, 72 and a back wall of the pan. For example, the anode pan assembly 52 can include one or more conductive ribs 82 that extend between a back wall 84 of the anode-side pan 62 and the anode assembly 70, while the cathode pan assembly 54 can include one or more conductive ribs 86 that extend between a back wall 88 of the cathode-side pan 66 and the cathode assembly 72. The one or more anode-side ribs 82 can be welded to the back wall 84 of the anode-side pan 62 while the one or more cathode-side ribs 86 can be welded to the back wall 88 of the cathode-side pan 66.

The one or more ribs 82, 86 of each pan assembly 52, 54 can be electrically coupled to its corresponding electrode assembly 70, 72 by one or more welds, e.g., one or more welds 90 that electrically couple the anode assembly 70 to the one or more ribs 82 of the anode pan assembly 52 and one or more welds 92 that electrically couple the cathode assembly 72 to the one or more ribs 86 of the cathode pan assembly 54. In an example, the ribs 82, 86 on one or both sides of the electrolyzer call can be coupled by the welds 90, 92 to one or both of the current collectors 74, 78. For example, as shown in FIGS. 2 and 3, the one or more welds 90 can electrically couple the one or more ribs 82 to the anode current collector 74 and/or the one or more welds 92 can electrically couple the one or more ribs 86 to the cathode current collector 78, or both.

In an example, the electrodes 56, 58 can be electrically connected to the one or more ribs 82, 86 and the one or more welds 90, 92. In examples where the electrode assembly 70, 72 includes the current collector 74, 78 that is welded to the one or more ribs 82, 86, then the electrode 56, 58 of the electrode assembly 70, 72 can be electrically connected to the current collector 74, 78 so that current can flow between the ribs 82, 86 and their corresponding electrode 56, 58 via the corresponding current collector 74, 78. For example, if an electrode 56, 58 is in direct physical contact with its corresponding current collector 74, 78, e.g., as shown for the example anode assembly 104 shown in FIG. 4 (described in more detail below), then current can flow directly from the current collector 74, 78 to the corresponding electrode 56, 58 or vice versa via the direct physical contact. In another example wherein the electrode assembly 70, 72 includes an elastic element 76, 80 or some other intermediate structure that includes a conductive material (e.g., a woven metal elastic element 76, 80 or an elastic element 76, 80 that is coated with a conductive material), e.g., as shown for both electrode assemblies 70, 72 in FIGS. 2 and 3 and for the cathode assembly 106 in FIG. 4, then current can flow from the current collector 74, 78 to the corresponding elastic element 76, 80 and then to the corresponding electrode 56, 58, or vice versa from the electrode 56, 58 to the corresponding elastic element 76, 80 and then to the corresponding current collector 74, 78. In an example, each of the electrode 56, 58, the current collector 74, 78, and the elastic element 76, 80 (if present) of the electrode assembly 70, 72 can be made from or can include nickel or another conductive metal. When the loading pressure across an interface is sufficiently high (e.g., the loading pressure provided by one or both of the elastic elements 76, 80 and/or a differential pressure across the cell), the contact resistance of a contact point between a nickel surface and another electrically conductive material is very low, such that when a nickel electrode 56, 58 is in contact with a nickel elastic element 76, 80 or with a nickel current collector 74, 78, electricity will readily flow through the contact point between the two nickel structures.

During operation of the electrolyzer cell 50, current can flow from a conductor (e.g., similar to the anode conductor 22 in the electrolyzer cell 10 of FIG. 1) into the anode-side pan 62. Next, the current can flow from the anode-side pan 62 to the one or more anode-side ribs 82 (e.g., through welds between the ribs 82 and the back wall 84), then to the anode current collector 74 via the one or more welds 90, and into the anode 56 (e.g., via the contact between the anode current collector 74 and the anode 56 or via an electrically-conductive intermediate structure such as the anode-side elastic element 76). The current can then pass between the anode 56 and the cathode 58 via the separator 60. The current then flows from the cathode 58 to the cathode current collector 78 (e.g., via the contact between the cathode 58 and the cathode current collector 78 or via an electrically-conductive intermediate structure such as the cathode-side elastic element 80), where it can then flow from the cathode current collector 78 to the one or more cathode-side ribs 86 via the one or more welds 92. Next, the current can flow from the one or more ribs 86 to the cathode-side pan 66 (such as via welds between the one or more ribs 86 and the back wall 88 of the cathode-side pan 66), and finally out of the electrolyzer cell 50 via a conductor (e.g., similar to the cathode conductor 24 in the electrolyzer cell 10 of FIG. 1) that is electrically connected to the cathode-side pan 66.

In an example, one or both of the pan assemblies 52, 54 also include a baffle plate that is fitted within its corresponding pan 62, 66 and that is generally aligned with the orientation of the pan 62, 66 and the electrode assembly 70, 72 of that particular pan assembly 52, 54. For example, the anode pan assembly 52 can include an anode-side baffle plate 94 located within the interior of the anode-side pan 62 and the cathode pan assembly 54 can include a cathode-side baffle plate 96 located within the interior of the cathode-side pan 66. In an example, each baffle plate 94, 96 can be coupled to a corresponding set of one or more ribs 82, 86 to position the baffle plate 94, 96 within its corresponding pan 62, 66, e.g., at a specified position relative to its corresponding electrode assembly 70, 72 and/or its corresponding back wall 84, 88.

In an example, one or both of the baffle plates 94, 96 comprise a solid plate that is configured to fit over or within the one or more ribs 82, 86 of its corresponding pan assembly 52, 54. In other examples, one or both of the baffle plates 94, 96 can comprise an expanded metal plate or a mesh. In an example, one or both of the baffle plates 94, 96 are made from a conductive metal, such as, but not limited to, nickel, stainless steel, and the like. In another example, one or both of the baffle plates 94, 96 are made from a polymeric material.

As will be appreciated by those having skill in the art, internal power dissipation affects internal temperature distribution within the electrolyzer cell 50. The contribution of internal power dissipation heating can be reduced or minimized through operating conditions such as the temperature, flow rate of electrolyte flowing through the pan assemblies 52, 54, and convection flow of the electrolyte to distribute heat more efficiently. High electrolyte flow rates can increase, and in some examples maximize, convective heat transfer within the electrolyzer cell 50, thereby helping to reduce or minimize heat buildup and the corresponding concomitant temperature rise within the cell 50 that could otherwise result from high current densities. The baffle plates 94, 96 can provide for mixing of electrolyte as it flows through the pan assemblies 52, 54 to enhance convective heat transfer within the electrolyte during electrolysis.

In some examples, the baffle plate 94, 96 is designed and positioned in its corresponding pan 62, 66 in such a way that the gas produced at the electrode assembly 70, 72 can mix with the electrolyte on the side of the baffle plate 94, 96 closest to the electrode assembly 70, 72, resulting in a relatively low density fluid column, which defines a riser region between the baffle plate 94, 96 and the electrode assembly 70, 72. The low density fluid mixture can rise relatively quickly through the riser region. Once above the top of the baffle plate 94, 96, the gas can disengage and flow into an outlet (such as a manifold, not shown in FIG. 2). A fraction of the electrolyte solution may then drop back down the opposite side of the baffle plate 94, 96, i.e., the side closer to the back wall 84, 88 of the pan 62, 66 and opposite to the electrode assembly 70, 72, which defines a downcomer region. The formation of the riser and down-comer regions creates a circulation loop.

The gas evolved at the electrode 56, 58 impacts the flow of the electrolyte, dragging some of the electrolyte up, and buffeting some of the electrolyte laterally. Gas lift occurs along the riser region adjacent to the electrode assembly 70, 72. The presence of the baffle plate 94, 96 creates a strong circulation within the pan assembly 52, 54. The flow of electrolyte in the riser region is strongly oriented upward due to gas lift, and the flow in the down-comer region is strongly oriented downward. The relatively high velocities and shear rates in the riser region help sweep gas from the electrode assembly 70, 72, and the formation of both the riser and down-comer regions provide efficient top to bottom mixing within the pan 62, 66 and drive increased convective cooling.

Thus, the baffle plate 94, 96 can be used to create a rapidly flowing circulation loop so that the electrolyte remains substantially isothermal as it flows through the pan assembly

52, 54. Due to the high degree of top-bottom mixing and circulation, rapid thermal equilibration of the electrolyte can be achieved as it flows into and through the pan assembly 52, 54. Another advantage is that relatively cold electrolyte can be introduced into the pan assembly 52, 54 which can equilibrate with warm circulating electrolyte fluid relatively quickly. The circulation rate (or laps of the recirculation loop during electrolyte transit through the pan 62, 66) can be anywhere from 1 to 200. The high circulation rate can also drive larger shear rates adjacent to the separator 60, helping to sweep gas away from the separator 60 and/or enhance or maximize heat transfer from the separator 60 to the electrode 56, 58.

The pan assemblies 52, 54 can be coupled together to enclose the interior of the electrolyzer cell 50. For example, one or more flanges 98 of the anode-side pan 62 can be coupled to a corresponding one or more flanges 100 of the cathode-side pan 66, such as with one or more fasteners 102. In the example shown in FIG. 2, the one or more fasteners 102 include one or more bolts and corresponding nuts that can be used to securely affix the flanges 98 and 100 together to enclose the interior of the pans 62, 66 and form the overall housing of the electrolyzer cell 50.

FIGS. 3 and 4 show close-up cross-sectional views of electrode assemblies that include current collectors, electrodes, and an elastic element on at least one side of the separator. FIG. 3 is a close-up view of the electrode assemblies 70, 72 in the example electrolyzer cell 50 of FIG. 2, wherein the anode assembly 70 includes the anode-side elastic element 76 that provides for a first compressive load to bias the anode 56 into contact with a first face of the separator 60 and the cathode assembly 72 includes the cathode-side elastic element 80 that provides a second compressive load to bias the cathode 58 into contact with an opposing second face of the separator 60. In an example, the anode-side elastic element 76 exerts a first controlled load onto the anode 56 in order to bias the anode 56 toward the first separator face to provide a zero-gap architecture on the anode side of the separator 60 while the cathode-side elastic element 80 exerts a second controlled load onto the cathode 58 in order to bias the cathode 58 toward the opposing second separator face to provide a zero-gap architecture on the cathode side of the separator 60.

FIG. 4 is a close-up view of an alternative electrolyzer cell that is similar to the electrolyzer cell 50 of FIGS. 2 and 3, except that the configuration of FIG. 4 includes alternative electrode assemblies 104, 106. The primary difference between the example of FIG. 3 and that of FIG. 4 is that the alternative anode assembly 104 includes an anode 56 and an anode current collector 74 but does not include an anode-side elastic element. Meanwhile, the alternative cathode assembly 106 in FIG. 4 is very similar to the cathode assembly 72 of FIG. 3 in that the alternative cathode assembly 106 includes a cathode 58, a cathode current collector 78, and a cathode-side elastic element 108. However, the cathode-side elastic element 108 that is part of the cathode assembly 106 is configured so that it can produce not just a sufficient controlled load to bias the cathode 58 toward the bottom face of the separator 60, e.g., to provide for sufficient contact between the cathode 58 and the bottom separator face. The cathode-side elastic element 108 also produces sufficient additional controlled load to also bias the separator 60 toward the anode 56, e.g., so that the upper face of the separator 60 is in sufficient contact with the anode 56. In other words, the cathode-side elastic element 108 of the alternative cathode assembly 106 is able to provide for a zero-gap architecture on both the anode side and the cathode side of the separator 60. The example electrode assemblies 104, 106 of FIG. 4, i.e., with one or more elastic elements 108 on the cathode side of the separator 60 and no elastic element on the anode side, are meant as a non-limiting example. Those having skill in the art will appreciate that the configuration can be reversed, e.g., with there being one or more elastic elements on the anode side of the separator 60 and no elastic element on the cathode side, without deviating from the scope of the present disclosure.

Additional details regarding various components or sub-structures that can be used in the electrolyzer cells of the present disclosure are described in U.S. Pat. No. 11,390,956, issued on Jul. 19, 2022, entitled "ANODE AND/OR CATHODE PAN ASSEMBLIES IN AN ELECTROCHEMICAL CELL, AND METHODS OF USE AND MANUFACTURE THEREOF;" in U.S. Pat. No. 11,431,012, issued on Aug. 30, 2022, entitled "ELECTROCHEMICAL CELL WITH GAP BETWEEN ELECTRODE AND MEMBRANE, AND METHODS TO USE AND MANUFACTURE THEREOF;" in U.S. Pat. No. 11,444,304, issued on Sep. 13, 2022, entitled "ANODE AND/OR CATHODE PAN ASSEMBLIES IN AN ELECTROCHEMICAL CELL, AND METHODS TO USE AND MANUFACTURE THEREOF;" in U.S. patent application Ser. No. 18/162,290, filed on Jan. 31, 2023, entitled "FLATTENED WIRE MESH ELECTRODE FOR USE IN AN ELECTROLYZER CELL;" in U.S. patent application Ser. No. 18/163,010, filed on Feb. 1, 2023, entitled "ELECTROLYZER CELL AND METHODS OF USING AND MANUFACTURING THE SAME;" in U.S. patent application Ser. No. 18/166,340, filed on Feb. 8, 2023, entitled "NANOPOROUS MEMBRANE SUPPORT IN AN ELECTROLYZER CELL;" and in U.S. Provisional Patent Application No. 63/578,863, filed on Aug. 25, 2023, entitled "ELECTROCATALYST COATED ELECTRODE FOR WATER ELECTROLYSIS AND METHOD OF PRODUCING SAME;" the disclosures of all of which are incorporated herein by reference in their entireties.

Protective Insert

While operating an electrolyzer cell with a zero-gap configuration is beneficial by reducing the distance between the electrodes to reduce ohmic resistance across the separator and, therefore, improving overall efficiency of the electrolyzer cell, a zero-gap architecture is not without challenges. For example, the contact between the electrodes 56, 58 and the separator 60 can lead to wear, particularly on the separator 60. In many commercial embodiments, separators comprises a polymer material (such as a perfluorinated polymer containing anionic groups), which may be excellent materials for the controlled exchange of specified ions, but which often lack mechanical robustness.

In addition, the trend in electrolysis has been to reduce separator thickness as much as possible to further reduce the inter-electrode distance. For example, commercially produced membranes are often as thin as about 5 micrometers ($\mu$m) or less, and in some examples as thin as about 1 $\mu$m. It is possible, even likely, that as separator technology advances, a suitable separator may be developed that is less than 1 $\mu$m thick. Very thin separators made from less robust materials can be vulnerable to wear and puncturing, which at best reduces the efficiency of the electrolyzer cell, and at worse requires regular shutdown and separator replacement.

Moreover, potential damage can be exacerbated when one or more elastic elements 76, 80, 108 are included to provide for adequate contact between one or both of the electrodes 56, 58 and the separator 60. As described above, a common type of elastic element for electrolysis is made from electrically conductive, resilient filaments that are woven or otherwise coupled together so that the filaments create resilient body that generates a spring-like force when the elastic element 76, 80, 108 is compressed. It is common for the elastic element 76, 80, 108 to be prefabricated (e.g., by a supplier) in large sheets having a specified size and then cutting the prefabricated sheets into specified sizes (e.g., with a specified width and length) to produce an elastic element with the dimensions that will fit the electrolyzer cell. In other words, the prefabricated woven sheet is cut so that the resulting elastic element 76, 80, 108 has roughly the same dimensions (i.e., roughly the same length and roughly the same width) as one or both of the corresponding current collector 74, 78 and the corresponding electrode 56, 58. When a prefabricated filamentous sheet is cut, it often leaves loose filament ends along each cut portion. Thus, when the elastic element 76, 80, 108 is made by cutting a prefabricated sheet there is at least one edge of the elastic element 76, 80, 108 that comprises loose filament ends.

When the elastic element 76, 80, 108 is compressed, the loose filament ends along the cut edges can be unconstrained and often protrude upward toward the separator 60 when the elastic element 76, 80, 108 is compressed. When the electrode 56, 58 is formed from a woven wire mesh (as described in more detail below), these protruding filament ends can find their way through openings in the mesh electrode 56, 58 and poke into the separator 60. These protruding filaments have been known to puncture and damage the separator 60.

Figure 5:
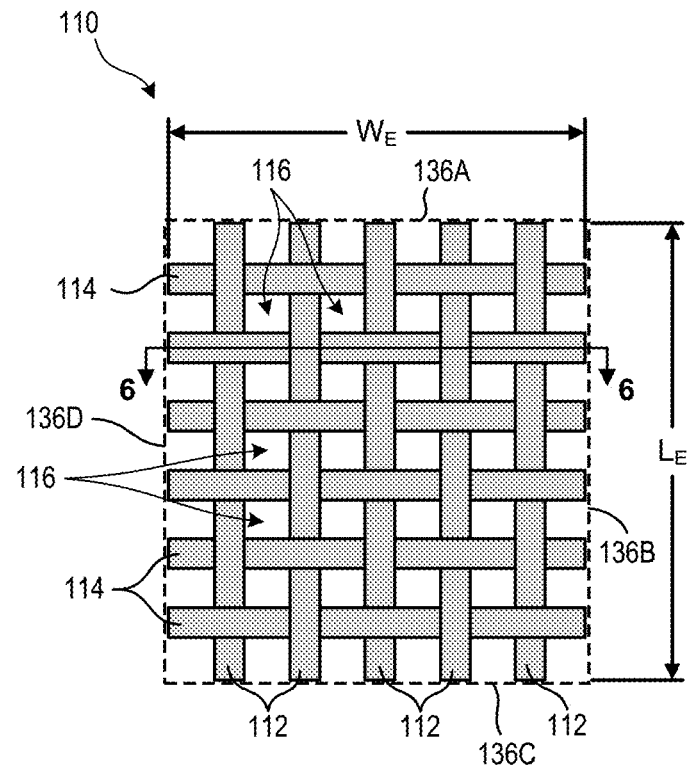
FIG. 5 is a plan view of an example mesh that can be used as an electrode in an electrolyzer cell.
Figure 6:
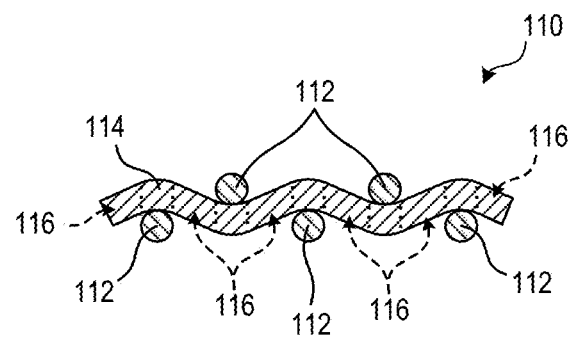
FIG. 6 is a cross-sectional view of the example mesh of FIG. 5 taken along line 6-6 in FIG. 5.

FIGS. 5 and 6 show a plan view and a cross-sectional view, respectively, of a non-limiting example of a woven mesh electrode 110 that can be used to form one or both of the electrodes 56, 58 in the example electrolyzer cells of FIGS. 2-4. In the example shown in FIGS. 5 and 6, the woven mesh electrode 110 is formed by a plain/double weave of warp wires 112 and shute wires 114. The size of the wires 112, 114 can be the same in both directions (as shown in FIGS. 5 and 6), or can be of different sizes. In the example shown, the weave of the wires 112, 114 results in mesh openings 116. In the example shown in FIGS. 5 and 6, each warp wire 112 passes alternatively over and under the shute wires 114 at right angles relative to one another and, similarly, each shute wire 114 passes alternatively over and under the warp wires 112, which results in the mesh openings 116 being rectangular or substantially rectangular. For the sake of simplicity, the example woven mesh electrode 110 is not depicted as including a catalyst coating in FIG. 6, but rather the woven mesh electrode 110 is shown as being a bare metal mesh. However, those having skill in the art will appreciate that the woven mesh electrode 110 could be provided with a catalyst coating on at least a portion of the outer surfaces of the woven mesh electrode 110.

Those having skill in the art will appreciate that the specific weave pattern shown for the woven mesh electrode 110 in FIGS. 5 and 6 (e.g., a plain/double weave of the warp wires 112 and the shute wires 114) is just one example of a woven mesh that can be used for the electrodes 56, 58. Any other weave pattern that is known or believed to be useful for a wire mesh electrode in an electrolyzer cell can be used without varying from the scope of the present disclosure. Other examples of weave patterns that can be used include, but are not limited to: a plain Dutch weave pattern, a reverse plain Dutch weave pattern, a twill weave pattern (e.g., a twill square weave pattern or a twill Dutch weave pattern), a reverse twill weave pattern, a twill Dutch double weave pattern, or a stranded weave pattern.

Figure 7:
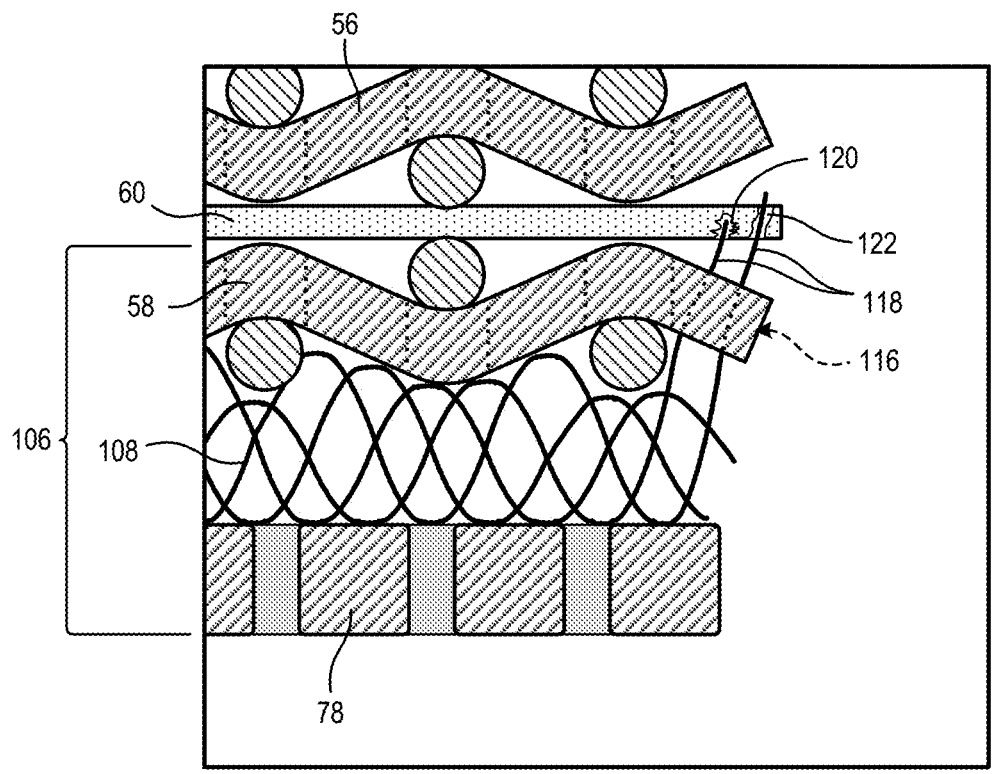
FIG. 7 is a close-up cross-sectional view of an example electrode assembly with filaments of an elastic element protruding through a mesh opening in an electrode and into a separator.

FIG. 7 is a cross-sectional view of an example scenario wherein loose filament ends 118 at the edges of the electrode assembly 106 have protruded through one of the mesh openings 116 of the electrode 58 and have caused damage to the separator 60. In the example depicted in FIG. 7, one of the filament ends 118 has partially punctured the separator 60 and created a tear 120, which could potentially expand over time and further damage the separator 60. The other filament end 118 has punctured completely through the separator 60 and created a pore 122 through which the electrolyte solution could leak, e.g., from the anode chamber to the cathode chamber of the electrolyzer cell, or vice versa. The pore 122 could also expand over time and result in further damage of the separator 60 and more pronounced electrolyte leakage.

In order to prevent or mitigate damage that can occur from filament ends protruding into the separator (such as is shown in FIG. 7), the electrolyzer cells of the present disclosure include one or more protective inserts that can be placed along at least a portion of one or more edges of an electrode assembly that includes an elastic element comprising one or more resilient filaments. The one or more protective inserts are configured to provide a barrier to prevent or mitigate filament ends from protruding into and potentially damaging the separator.

Figure 8:
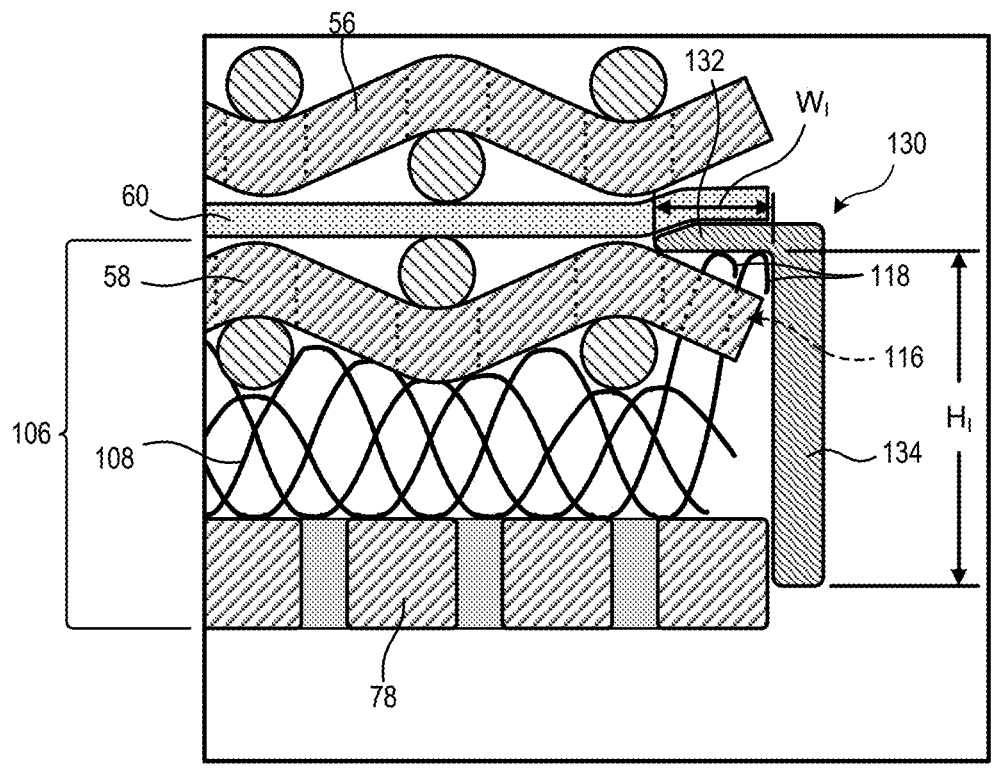
FIG. 8 is a close-up cross-sectional view of an example electrode assembly with a protective insert engaged with the electrode assembly to prevent filaments of the elastic element from protruding into the separator.

FIGS. 8-12, 13A-13C, 14A, 14B, 15A, 15B, 16A and 16B show various examples of protective inserts that can be used with one or more of the electrode assemblies 70, 72, 106 for prevention or mitigation of damage to the separator 60 by loose filament ends. FIG. 8 is a side cross-sectional view of an example protective insert 130 engaged with a corresponding electrode assembly. FIG. 8 shows an embodiment where the protective insert 130 is engaged with the electrode assembly 108 that includes an elastic element 108, while the electrode assembly on the other side of the separator 60 may not include an elastic element. Those having skill in the art, however, will appreciate that a similar or identical protective insert 130 could be used with one or both of the anode assembly 70 and the cathode assembly 72 of FIGS. 2 and 3.

In an example, the protective insert 130 includes a top cover portion 132 and an edge portion 134. As shown in FIG. 8, the top cover portion 132 can be sized and configured so that the top cover portion 132 will fit over a portion of the electrode 56, 58 (the cathode 58 in the case of FIG. 8) on the same side of the electrode 56, 58 onto which the separator 60 will be positioned (e.g., on top of the cathode 58 in the orientation shown in FIG. 8).

The edge portion 134 can be sized and configured to fit into a seam 138 between the corresponding electrode assembly 70, 72, 106 and the side wall of the corresponding pan 62, 66 (shown in FIGS. 3 and 4) and to extend down past the electrode 56, 58 and cover at least a portion of an edge of the elastic element 76, 80, 108. The seam 138 between the electrode assembly 70, 72, 106 and the side wall of the pan 62, 66 can be relatively narrow, e.g., from about 0.5 mm to about 5 mm or less, such as about 2.5 mm or less, about 2 mm or less, about 1.5 mm or less, or about 1 mm or less. Therefore, in an example, the edge portion 134 has a thickness that is smaller than the narrow gap size of the seam 138. In an example, the relatively narrow edge portion 134 can allow a person assembling the electrolyzer cell by hand to simply insert the edge portion 134 of the protective insert 130 into the gap formed at the seam 138 without having to use specialized tool or other special equipment. This can greatly simplify the installation process for the person installing the electrolyzer cell.

In the example shown in FIG. 8, the edge portion 134 extends downward from a proximal end, to which the top cover portion 132 is connected, to a distal end of the edge portion 134 so that the edge portion 134 can cover at least a portion of the edge of the corresponding electrode assembly 70, 72, 106. The edge portion 134 extends at an angle relative to the top cover portion 132, e.g., so that the top cover portion 132 can be abutted against the exposed face of the electrode 56, 58 and so that the edge portion 134 can extend across the thickness of the electrode assembly 70, 72, 106 and cover at least a portion of the edge of the electrode assembly 70, 72, 106. In an example, both the top cover portion 132 and the edge portion 134 are planar or generally planer and the edge portion 134 is normal or substantially normal to the top cover portion 132. In an example, the edge portion 134 is sufficiently long such that the distal end of the edge portion 134 is proximate to the current collector 74, 78 so that the edge portion 134 completely covers the edge of the elastic element 76, 80, 108. The separator 60 can be positioned over the top of the top cover portion 132 of the protective insert 130. As can be seen in FIG. 8, the protective insert 130 is positioned such that if one or more loose filament ends 118 of the elastic element 76, 80, 108 do protrude through one of the mesh openings 116 in the electrode 56, 58, then the top cover portion 132 will block the filament ends 118 so that the filament ends 118 will not protrude beyond the top face of the electrode 58 and into the separator 60.

Figure 9:
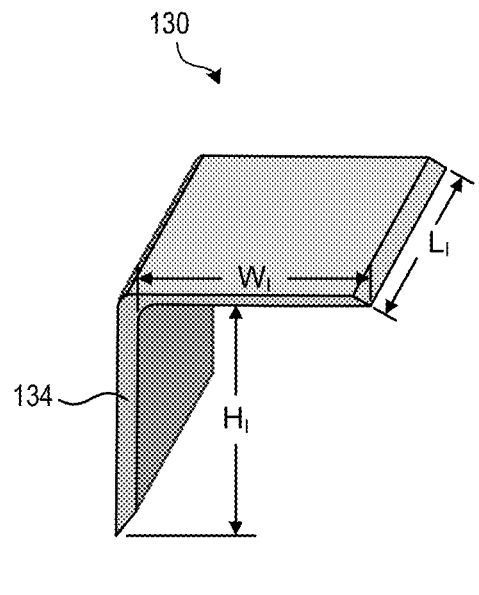
FIGS. 9-12 are perspective views of various examples of protective inserts that can be used to prevent filaments of an elastic element from protruding into a separator of an electrolyzer cell.

FIG. 9 shows a perspective view of a portion of the protective insert 130 that is used in FIG. 8. The protective insert 130 can include defined dimensions that can be selected to achieve one or more goals. As shown in FIG. 9, the protective insert 130 can include an insert height $H_I$ (also shown in FIG. 8), an insert width $W_I$ (also shown in FIG. 8), and an insert length $L_I$. The insert height $H_I$ corresponds to the portion of the outer edge of the electrode assembly 70, 72, 106 that is covered by the protective insert 130, e.g., by the edge portion 134 of the protective insert 130 (best seen in FIG. 8). The insert width $W_I$ corresponds to the amount of the corresponding electrode 56, 58 that is covered by the protective insert 130, e.g., how far from the edge of the electrode 56, 58 that the top cover portion 132 of the protective insert 130 covers (best seen in FIG. 8). The insert length $L_I$ corresponds to the length along a peripheral edge of the electrode assembly 70, 72, 106 that each individual protective insert 130 will extend, e.g., the length of the portion covered by the top cover portion 132 along a peripheral edge of the exposed face of the electrode 56, 58 (e.g., as depicted conceptually by the dashed lines 136A, 136B, 136C, and 136D for the woven mesh electrode 110 in FIG. 5), which may be collectively or generically referred to herein as "the edge 136" or "the edges 136".

Although FIG. 9 shows the insert length $L_I$ being approximately equal to the insert width $W_I$, those having skill in the art will appreciate that the insert length $L_I$ for an individual protective insert 130 can be much longer than the insert width $W_I$ and the insert height $H_I$ so that the particular protective insert 130 can cover a substantial portion of the electrode length $L_E$ or of the electrode width $W_E$ (shown in FIG. 5) with a single protective insert 130. For example, if the shape of the exposed face of the corresponding electrode 56, 58 is rectangular with an electrode length $L_E$ in a first direction (e.g., up and down as depicted for the woven mesh electrode 110 of FIG. 5) and an electrode width $W_E$ in a second direction (e.g., left to right as depicted for the woven mesh electrode 110 of FIG. 5), to cover the entirety of the edges 136 of that electrode 56, 58, four (4) of the protective insert 130 could be provided or received (or four sets of protective insert groupings), with two (2) of the protective inserts 130 having an insert length $L_I$ (or two (2) of protective insert groupings having a total length) that is equal or substantially equal to the electrode length $L_E$ (e.g., the length $L_E$ of the electrode 110 along edges 136B and 136D in FIG. 5) and the other two (2) protective inserts 130 having an insert length $L_I$ (or the other two (2) of the protective insert groupings having a total length) that is equal or substantially equal to the electrode width $W_E$ (e.g., the width $W_E$ of the electrode 110 along edges 136A and 136C in FIG. 5).

In a non-limiting example, the insert height $H_I$ can be from about 1 millimeter (mm) to about 40 mm, such as from about 2 mm to about 25 mm, for example from about 3 mm to about 10 mm. In an example, the insert height $H_I$ can be selected to be roughly equal to the total thickness of the electrode assembly 70, 72, 106 (e.g., the combined thickness of the electrode 56, 58, the elastic element 76, 80, 108, and the current collector 74, 78) so that the edge portion 134 will cover all or substantially all of the outer edge of the electrode assembly 70, 72, 106. In a non-limiting example, the insert width $W_I$ can be from about 5 mm to about 40 mm, such as from about 10 mm to about 25 mm, for example from about 15 mm to about 20 mm. In an example, the insert width $W_I$ can be selected so that the top cover portion 132 covers the entirety of the outermost mesh openings 116 in the electrodes (e.g., the mesh openings 116 closest to the edge 136) so that if loose filament ends 118 protrude through the outermost mesh openings 116, the top cover portion 132 will prevent the filament ends 118 from puncturing or otherwise damaging the separator 60. As mentioned above, the insert length $L_I$ can be chosen based on the overall dimensions of the electrode 56, 58 (e.g., based on the electrode length $L_E$ and the electrode width $W_E$ for a rectangular electrode 56, 58). If it is desired to use a single protective insert 130 on each edge of the electrode 56, 58, then the insert length $L_I$ can be as large as the electrode length $L_E$ or the electrode width $W_E$. However, in other examples, it may be desired to use a plurality of protective inserts 130 along one or more of the edges of the electrode 56, 58, in which case the average insert length $L_I$ along one edge of the electrode 56, 58 can be equal to the electrode length $L_E$ or the electrode width $W_E$ divided by the total number of protective inserts 130 used along that edge. In other words, the insert length $L_I$ can be anywhere from a minimum specified length (e.g., about 1 mm, about 2 mm, about 3 mm, about 4 mm, about 5 mm, about 6 mm, about 7 mm, about 8 mm, about 10 mm, and so on) up to a maximum insert length $L_I$ that is equal or substantially equal to the electrode length $L_E$ or the electrode width $W_E$ (which in non-limiting examples could be, about 0.1 meters (m), about 0.2 m, about 0.25 m, about 0.3 m, about 0.4 m, about 0.5 m, about 0.5 m, about 0.7 m, about 0.75 m, about 0.8 m, about 0.9 m, about 1 m, about 1.1 m, about 1.2 m, about 1.25 m, about 1.3 m, about 1.4 m, about 1.5 m, about 1.6 m, about 1.7 m, about 1.75 m, about 1.8 m, about 1.9 m, about 2 m, about 2.1 m, about 2.2 m, about 2.25 m, about 2.3 m, about 2.4 m, about 2.5 m, about 2.6 m, about 2.7 m, about 2.75 m, about 2.8 m, about 2.9 m, about 3 m, about 3.1 m, about 3.2 m, about 3.25 m, about 3.3 m, about 3.4 m, about 3.5 m, about 3.6 m, about 3.7 m, about 3.75 m, about 3.8 m, about 3.9 m, about 4 m, about 4.1 m, about 4.2 m, about 4.25 m, about 4.3 m, about 4.4 m, about 4.5 m, about 4.6 m, about 4.7 m, about 4.75 m, about 4.8 m, about 4.9 m, about 5 m, or more).

Figure 10:
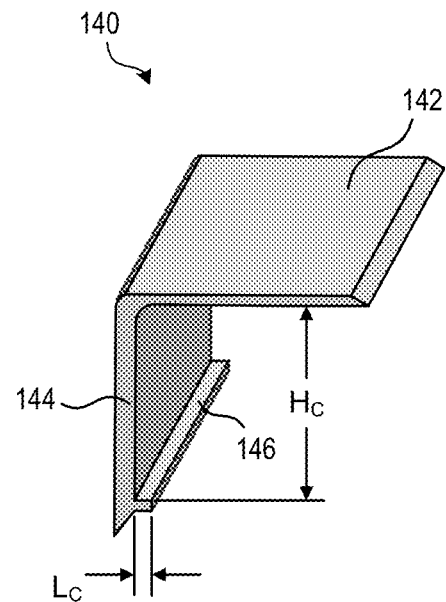

FIG. 10 shows a perspective view of another example protective insert 140. The protective insert 140 of FIG. 10 is similar to the protective insert 130 of FIGS. 8 and 9 in that the protective insert 140 includes a top cover portion 142 and an edge portion 144, which can be substantially similar to the top cover portion 132 and the edge portion 134 of the protective insert 130. The top cover portion 142 and the edge portion 144 of the protective insert 140 can have similar or identical sizes and functions to those described above for the top cover portion 132 and the edge portion 134 of the protective insert 130. For example, one or more of the dimensions of the protective insert 140 of FIG. 10 (e.g., the insert height $H_I$, insert width $W_I$, and insert length $L_I$, although not depicted in FIG. 10) can be similar or identical to those described above for the protective insert 130 of FIG. 9. The primary difference between the protective insert 140 of FIG. 10 and the protective insert 130 of FIG. 9 is that the protective insert 140 includes an engagement member coupled to the edge portion 144 at or proximate to its distal end, wherein the engagement member is configured to engage the electrode assembly 70, 72, 106, for example by engaging the current collector 74, 78. In the example shown in FIG. 10, the engagement member is a cleat 146 that protrudes from at or proximate to the distal end of the edge portion 144 such that the protective insert 140 can "lock" into place on the electrode assembly 70, 72, 106. In an example, the edge portion 144 and the cleat 146 are sized and positioned so that the cleat 146 can latch onto a structure of the corresponding electrode assembly 70, 72, 106 to provide a more secure engagement between the protective insert 140 and the corresponding electrode assembly 70, 72, 106. For example, the insert length $L_I$ can be selected so that the edge portion 144 will extend past the back side of the electrode assembly 70, 72, 106 (e.g., the back face of the current collector 74, 78 that faces the interior of the pan 62, 66) and so that the cleat 146 can snap over or onto the back side of the electrode assembly 70, 72, 106 so that the top cover portion 142 is engaged with the exposed face of the electrode 56, 58 and the cleat 146 is engaged with the back side of the electrode assembly 70, 72, 106 (e.g., with the back face of the current collector 74, 78).

In an example, a height $H_C$ of the cleat 146 relative to the top cover portion 142 (FIG. 10) is equal or substantially equal to the total thickness of the electrode assembly 70, 72, 106 in its compressed state (e.g., when the electrode assembly 70, 72, 106 is compressed and producing the compressed load that will bias the electrode 56, 58 toward the separator 60). In an example, this height He can be from about 1 mm to about 30 mm, such as from about 2 mm to about 25 mm, for example from about 3 mm to about 10 mm In an example, the length $L_C$ of the cleat 146 can be long enough to provide for relatively secure engagement between the cleat 146 and the back side of the electrode assembly 70, 72, 106 (e.g., the back face of the current collector 74, 78), such that the protective insert 140 can "lock onto" the electrode assembly 70, 72, 106. In an example, the length $L_C$ of the cleat 146 can be from about 0.5 mm to about 5 mm, such as from about 0.75 mm to about 4 mm, for example from about 1 mm to about 3 mm.

Figure 11:
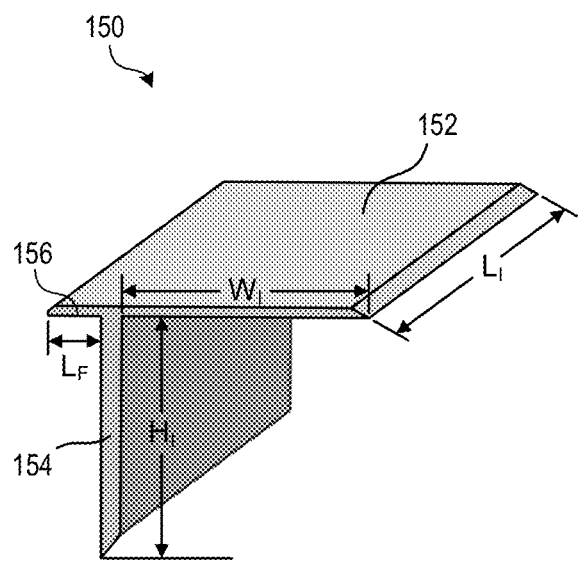

FIG. 11 shows a perspective view of another example protective insert 150. The protective insert 150 is similar to the protective insert 130 of FIGS. 8 and 9. For example, like the protective insert 130, the protective insert 150 includes a top cover portion 152 coupled to a proximal end of an edge portion 154, which be substantially similar to the top cover portion 132 and the edge portion 144 of the protective insert 130. The top cover portion 152 and the edge portion 154 of the protective insert 150 can have similar or identical sizes and functions to those described above for the top cover portion 132 and the edge portion 134 of the protective insert 130. For example, one or more of the dimensions of the protective insert 150 of FIG. 11 (e.g., the insert height $H_I$, insert width $W_I$, and insert length $L_I$) can be similar or identical to those described above for the protective insert 130 of FIG. 9. The primary difference between the protective insert 150 of FIG. 11 and the protective insert 130 of FIG. 9 is that the protective insert 150 includes a flange portion 156 coupled to the proximal end of the edge portion 154 (e.g., proximate to where the top cover portion 152 is coupled to the edge portion 154) and that protrudes from the edge portion 154 in a direction that is opposite or generally opposite from the direction that the top cover portion 152 protrudes, e.g., such that the flange portion 156 protrudes away from the electrode assembly 70, 72, 106 and toward the outside of the pan 62, 66. In an example, the flange portion 156 is sized and configured to at least partially cover the seam 138 between the electrode assembly 70, 72, 106 and the pan 62, 66, and in some examples the flange portion 156 is sized and configured to fit over a portion of the flange 98, 100 of the pan 62, 66. The flange portion 156 can also provide additional stability for the protective insert 150 after it has been inserted into position and can provide assurance that the protective insert 150 has been inserted to a desired depth relative to the electrode assembly 70, 72, 106 and the pan 62, 66. The flange portion 156 can also ensure that the protective insert 150 is oriented at a desired alignment relative to the electrode assembly 70, 72, 106 and the pan 62, 66, e.g., by positioning and orienting a bottom surface of the flange portion 156 to engage with a top surface of the pan flange 98, 100. In an example, the flange portion 156 has a length $L_F$ of from about 0.5 mm to about 5 mm, such as from about 1 mm to about 4 mm, for example from about 1.25 mm to about 3 mm, such as from about 1.5 mm to about 2.5 mm.

Figure 12:
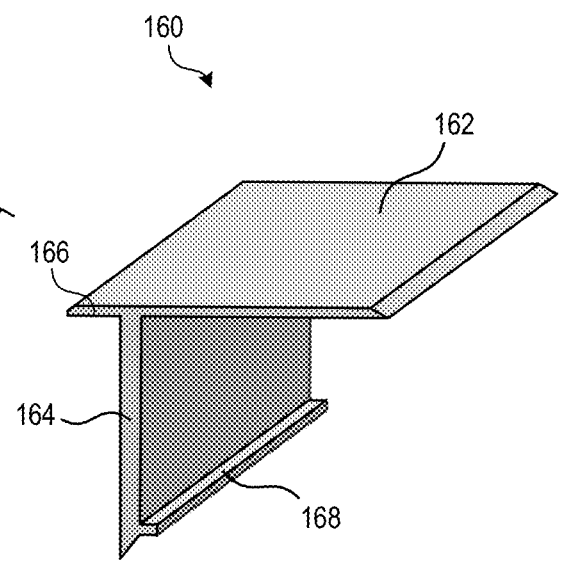

FIG. 12 shows a perspective view of another example protective insert 160. The protective insert 160 of FIG. 12 is similar to the protective insert 150 of FIG. 11. For example, the protective insert 160 includes a top cover portion 162, an edge portion 164, and a flange portion 166, which can be substantially similar to the top cover portion 152, the edge portion 154, and the flange portion 156 of the protective insert 150. The top cover portion 162, the edge portion 164, and the flange portion 166 of the protective insert 160 can have similar or identical sizes and functions to those described above for the top cover portion 152, the edge portion 154, and the flange portion 156 of the protective insert 150. For example, one or more of the dimensions of the protective insert 160 of FIG. 12 (e.g., the insert height $H_I$, insert width $W_I$, insert length $L_I$, and flange length $L_F$, although not depicted in FIG. 12) can be similar or identical to those described above for the protective insert 150 of FIG. 11. The primary difference between the protective insert 160 of FIG. 12 and the protective insert 150 of FIG. 11 is that the protective insert 160 includes a cleat 168 that protrudes from at or proximate to a distal end of the edge portion 164, similar to the cleat 146 of the protective insert 140 of FIG. 10. The cleat 168 can perform a similar or the same function as the cleat 146, e.g., to "lock" the protective insert 160 into place on the electrode assembly 70, 72, 106. Other parameters of the cleat 168 (e.g., the height $H_C$ of the cleat 168 relative to the top cover portion 162 or the length $L_C$ that the cleat 168 protrudes from the edge portion 164, although not shown in FIG. 12) can be similar or identical to those described above for the protective insert 140 of FIG. 10.

FIGS. 13A-13C, 14A, 14B, 15A, 15C, 16A, and 16B show various cross-sectional views of yet another example protective insert 170 during various processes of installing the protective insert. Although there are slight differences between the structures of the protective insert 170 as shown in FIGS. 13-13C, in FIGS. 14A and 14B, in FIGS. 15A and 15B, and in FIGS. 16A and 16B, the same reference numbers are used in all of FIGS. 13A-13C, 14A, 14B, 15A, 15C, 16A, and 16C for simplicity.

The protective insert 170 is similar to the protective insert 160 of FIG. 12. In particular, the protective insert 170 includes a top cover portion 172 (which can be similar or identical to any one of the top cover portions 132, 142, 152, and 162, described above), an edge portion 174 (which can be similar or identical to any one of the edge portions 134, 144, 154, and 164, described above), and a flange portion 176 (which can be similar or identical to either of the flange portions 156 and 166, described above).

The protective insert 170 also includes an engagement member coupled to the edge portion 174 at or proximate to its distal end, wherein the engagement member is configured to engage the electrode assembly 70, 72, 106, for example by engaging the current collector 74, 78, i.e., similar to the cleats 146 and 168, to provide a more secure connection between the protective insert 170 and the electrode assembly 70, 72, 106. But unlike the cleats 146, 168 (which may be relatively rigid and may rely on flexibility of the edge portions 144, 164 to allow the cleat 146, 168 to be snapped over the electrode assembly 70, 72, 106), the protective insert 170 includes a deformable and resilient protrusion 178 to engage the electrode assembly 106. In an example, the deformable protrusion 178 is located at or proximate to the distal end of the edge portion 174, but the protrusion 178 could be located at another position along the edge portion 174 (such as if the insert height $H_I$ of the edge portion 174 was longer than the total thickness of the electrode assembly 106). FIGS. 13A-13C, 15A, 15B, 16A, and 16B show the protective insert 170 being used with the electrode assembly 106 that includes an elastic element 108, while the electrode assembly on the other side of the separator 60 may or may not include an elastic element. Those having skill in the art, however, will appreciate that a similar or identical protective insert 170 can be used with an electrode assembly that does not include an elastic element, such as with the electrode assembly 106' of FIGS. 14A and 14B.

The protrusion 178 can be formed from a resilient material that can be deformed and can return to its original shape, such as a resilient polymer or a rubber. As can be seen in FIGS. 13A, 14A, 15A, and 16A, the deformable protrusion 178 can be configured to protrude from the edge portion 174 on the same side of the edge portion 174 that will be positioned proximate to the electrode assembly 106, 106'. The resilient material allows the protrusion 178 to be deformable between an extended position and a compressed position. When the edge portion 174 is inserted into the gap between the electrode assembly 106, 106' and the pan 66 at the seam 138, the protrusion 178 can be deformed (e.g., compressed) toward the edge portion 174 by the electrode 58 and/or by the elastic element 108 and/or by the current collector 78 so that the protrusion 178 moves from its extended position (as shown in FIG. 13A) to its compressed position (as shown in FIG. 13B). The deformation of the protrusion 178 can allow the edge portion 174 and the protrusion 178 to fit within the gap between the electrode assembly 106, 106' and the wall of the pan 66. After the edge portion 174 has been inserted far enough into the seam 138, the protrusion 178 will no longer be engaged by the electrode assembly 106, 106', and the resilient material can allow the protrusion 178 to return to its extended position away from the edge portion 174, as shown in FIGS. 13C, 14B, 15B, and 16B. When the protrusion 178 has returned to its extended position, the protrusion 178 can engage a back face of the electrode assembly 106, 106', e.g., the back face of the current collector 78 in the example shown in FIGS. 13C, 14B, and 15B, or another structure of the electrode assembly 106, 106', such as a portion of the electrode 58 that has been wrapped around the back side of the current collector 78, as shown in the example of FIG. 16B. In an example, the protrusion 178 can provide a clamping force, such as by clamping the electrode assembly 70, 72, 106 between a bottom surface of the top cover portion 172 and a top-most surface of the protrusion 178 (as viewed in the orientation of FIG. 13C), to secure the protective insert 170 to the electrode assembly 106, 106'. In an example, the clamping force can be provided by forming the protective insert 170 so that a height $H_I$ of the edge portion 174 (e.g., the distance between the bottom surface of the cover portion 172 and the top-most surface of the protrusion) is smaller than the uncompressed thickness $T_A$ of the electrode assembly 106, 106' (e.g., the total thickness of the components of the electrode assembly 106, 106' when no compressive force is being exerted to deform the elastic element 108. When the protective insert 170 is inserted into the seam 138, the installer can exert enough force to compress at least an edge portion of the elastic element 108 (as shown in FIG. 13C) or an edge portion of the wires or other structures of the electrode 58 (as shown in FIG. 14B) until the protrusion 178 passes the back side of the electrode assembly 106, 106' and is no longer engaged by the electrode 58, the elastic element 108, the current collector 78 or any other structure of the electrode assembly 106, 106', and which point, the protrusion 178 can return to the extended position and engage the back side of the electrode assembly 106, 106'. But, since the insert height $H_I$ is smaller than the uncompressed thickness $T_A$ of the electrode assembly 106, 106', the protective insert 170 will produce a clamping force on the electrode assembly 106, 106', which can ensure sufficient electrical contact between the electrode 58 and another conductive structure, such as the elastic element 108 or the current collector 78.

The protective insert 170 can also make installation of the electrode assembly 106, 106' into the electrolyzer cell easier and, therefore, more reliable, quicker, more efficient, and less expensive. As described above, each electrode can be formed from a fine wire mesh or other bendable material. This can allow the electrode body to be maneuvered into contact with the other structures of the electrode assembly, such as an elastic element or a current collector. For example, the electrode body can be bent or folded over the current collector and then can be coupled to the current collector to ensure there is sufficient electrical contact between the electrode and the current collector. However, it has been difficult to manipulate bendable electrode bodies quickly and easily, like wire meshes, in a way that will ensure the desired electrical contact. It often became necessary to perform a specific and particular sequence of events. For example, an installer might have to carefully insert the mesh electrode into the small gap between a pan wall and the current collector, reach into the gap to bend the electrode around the current collector, and then apply the means of coupling the electrode to the current collector (which may also require difficult manipulation of fasteners, tools, or other equipment). Even if this process were to be performed effectively, it could also be possible for the mesh electrode to partially straighten back out and come out of contact with the current collector before the electrode was coupled, requiring the process to be repeated again to fold the electrode into contact with the current collector.

The protective insert 170 can simplify this process because the protective insert 170 can simultaneously or substantially simultaneously act as an insertion-aiding tool (which helps to bend the electrode into a desired position relative to the rest of the electrode assembly) and a coupling structure that provides for sufficient electrical contact and securement between the electrode and one or more conductive structures of the electrode assembly. FIGS. 13A-13C, 14A, and 14B showed one example method of how this can occur, as described above, e.g., with the electrode 58 and/or the elastic element 108 (if present) being compressed and clamped by the protective insert 170 so that the electrode 58 is in electrical contact with a top face of the elastic element 108 (as in FIG. 13C) or with a top face of the current collector 78 (as in FIG. 14B). In both the example of FIGS. 13A-13C and the example of FIGS. 14A and 14B, the electrode 58 has an areal size (e.g., a cross-sectional shape and dimensions) that is approximately the same as the areal size of the elastic element 108 and/or the current collector 78 (e.g., so that the cross-sectional shape of the electrode 58 is substantially the same as the cross-sectional shape of the current collector 78 and/or the elastic element 108, and such that the dimensions—i.e., the length and width if the cross-sectional shape is rectangular—are the same or substantially the same as the current collector 78 and/or the elastic element 108. In such an example, the height $H_1$ of the edge portion 174 of the protective insert 170 is smaller than an uncompressed thickness $T_A$ of the electrode assembly 106, 106' so that the protective insert 170 can at least partially compress the electrode assembly 106, 106' and provide a clamping force (as discussed above).

Figure 15A:
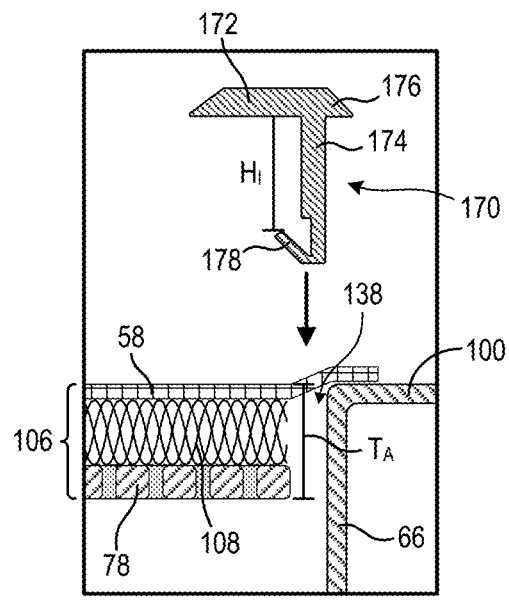
FIGS. 15A and 15B show close-up cross-sectional views of a process of installing the example protective insert onto yet another example electrode assembly.
Figure 15B:
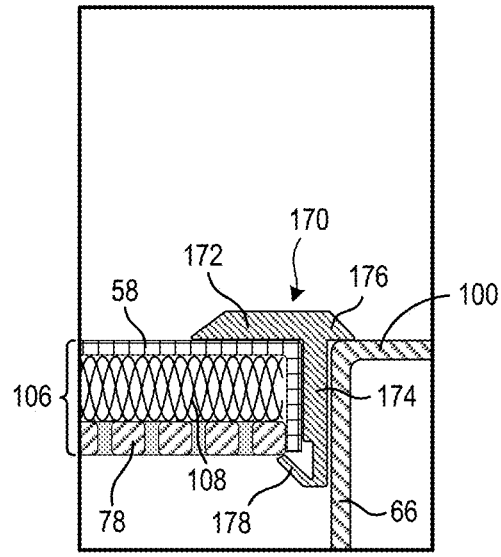
Figure 16A:
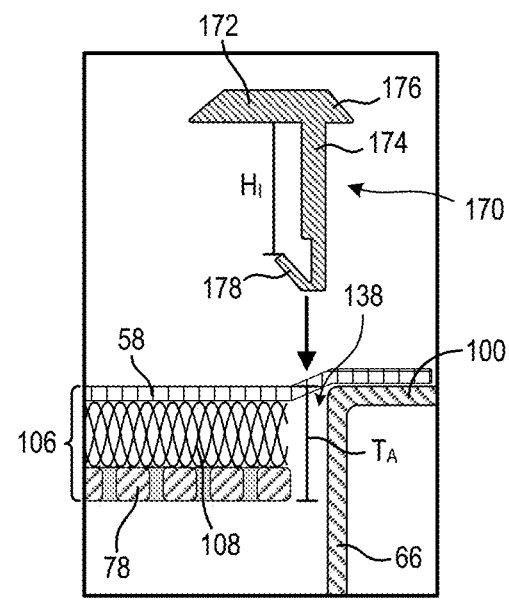
FIGS. 16A and 16B show close-up cross-sectional views of a process of installing the example protective insert onto another example electrode assembly.
Figure 16B:
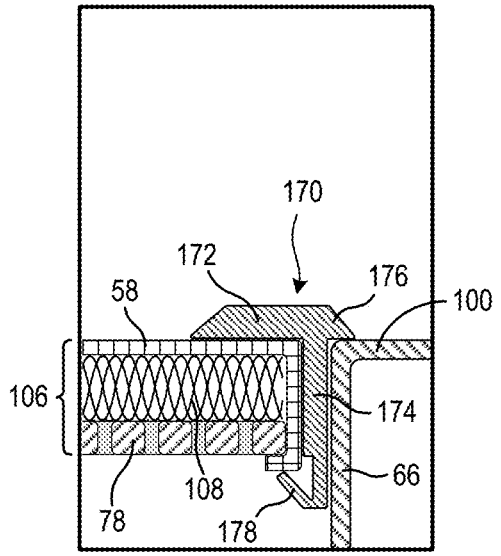

In other examples, the electrode 58 can be sized to be oversized relative to the areal size of the rest of the electrode assembly 106, 106' so that the electrode 58 extends past the current collector 78 and/or the elastic element 108, as shown in FIGS. 15A and 16A. As mentioned above, in prior systems, the extra portions of the electrode 58 would have to be fed into the seam 138 between the electrode assembly 106, 106' and the pan 66 and further manipulated so that the electrode 58 will be in sufficient electrical contact with the current collector 78 and/or the elastic element 108. But, the protective insert 170 can greatly simplify this process. As shown in FIGS. 15A and 16A, the excess portion of the electrode 58 can be laid over the top of the pan 66 (e.g., onto the flange 100), and then the edge portion 174 of the protective insert 170 can be pushed into the seam 138, which bends the excess portion of the electrode 138 into the space of the seam 138. Then, when the protrusion 178 reaches the back side of the electrode assembly 106, the protrusion 178 can either engage the back side (i.e., the back face of the current 78) and the excess portion of the electrode 58 can be held between the lateral edge of the electrode assembly 106 and the edge portion 174 of the protective insert 170 so that the excess portion is in electrical contact with the current collector 78 and/or the elastic element 108, as shown in FIG. 15B, or as the protrusion 178 returns to its extended position the protrusion 178 can further bend the end of the excess portion of the electrode 58 so that it bends into the back side of the electrode assembly 106 (e.g., into the back face of the current collector 78), as shown in FIG. 16B. In this way, the protective insert 190 can act to both easily push the electrode 58 into the seam 138 and to "stake" or "pin" the electrode 58 to the rest of the electrode assembly 106 with the simple action for the installer of inserting the edge portion 174 into the seam 138.

Each of the example protective inserts 130, 140, 150, 160, and 170 described above can be made from a material that is rigid and hard enough so that it will not be pierced by the filament ends 118 and that will be strong enough to cause the filament ends 118 to bend or otherwise deform away from the separator 60, as shown in FIG. 8. In an example, the protective insert 130, 140, 150, 160, 170 is made from a thermoplastic or another polymeric material. The thermoplastic or polymeric material that is used to form the protective insert 130, 140, 150, 160, 170 is preferably chemically inert or chemically resistant to the electrolyte that will be flowing through the electrolyzer cell (e.g., KOH or NaOH). In an example, the thermoplastic or polymeric material that is used to form the protective insert 130, 140, 150, 160, 170 comprises a moldable polymer, such as an injection moldable thermoplastic, including, but not limited to, polypropylene (PP), polyethylene (PE), acrylonitrile butadiene styrene (ABS), nylon, and polyethylene terephthalate (PET).

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An electrochemical electrode assembly comprising:
   an electrode comprising a first electrode face and a second electrode face opposing the first electrode face;
   a support member configured to be coupled to a housing of an electrolyzer cell;
   an elastic element comprising a plurality of resilient filaments coupled together into a resilient body, wherein the elastic element is compressed between the support member and the electrode so that the elastic element generates a controlled load against the first electrode face to load the second electrode face against a corresponding face of a separator; and
   a first protective insert abutted against the second electrode face along at least a portion of a first edge of the electrode, wherein the first protective insert prevents filaments of the elastic element from protruding beyond the second electrode face.

2. The electrochemical electrode assembly of claim 1, wherein the electrode comprises a mesh defining a plurality of mesh openings each extending from the first electrode face to the second electrode face, wherein the first protective insert prevents filaments of the elastic element from extending through one or more of the mesh openings that are proximate to the first edge of the electrode and protruding beyond the second electrode face.

3. The electrochemical electrode assembly of claim 1, wherein the first protective insert comprises a top cover portion and an edge portion having a proximal end and a distal end, wherein the top cover portion is coupled to the edge portion at or proximate to the proximal end, and wherein the top cover portion is abutted against the second electrode face along the portion of the first edge and is angled relative to the edge portion so that the edge portion extends from the second electrode face toward the support member.

4. An electrochemical electrode assembly comprising:
   an electrode comprising a first electrode face and a second electrode face opposing the first electrode face;
   a support member configured to be coupled to a housing of an electrolyzer cell;
   an elastic element comprising a plurality of resilient filaments coupled together into a resilient body, wherein the elastic element is compressed between the support member and the electrode so that the elastic element generates a controlled load against the first electrode face; and
   a first protective insert abutted against the second electrode face along at least a portion of a first edge of the electrode, wherein the first protective insert prevents filaments of the elastic element from protruding beyond the second electrode face, the first protective insert comprising:
      a top cover portion and an edge portion having a proximal end and a distal end, wherein the top cover portion is coupled to the edge portion at or proximate to the proximal end, and wherein the top cover portion is abutted against the second electrode face along the portion of the first edge and is angled relative to the edge portion so that the edge portion extends from the second electrode face toward the support member; and
      at least one of a cleat or a deformable resilient protrusion coupled to the edge portion at or proximate to the distal end.

5. The electrochemical electrode assembly of claim 1, wherein the first protective insert is formed from a polymer material.

6. The electrochemical electrode assembly of claim 5, wherein the polymer material comprises at least one of polypropylene, polyethylene, acrylonitrile butadiene styrene, nylon, and polyethylene terephthalate.

7. The electrochemical electrode assembly of claim 1, further comprising a second protective insert abutted against the second electrode face along at least a portion of a second edge of the electrode, wherein the second protective insert prevents filaments of the elastic element from protruding beyond the second electrode face.

* * * * *